Aug. 25, 1964 W. M. JEFFERS 3,146,421
TRAFFIC SIGNAL CONTROLLER
Filed Aug. 4, 1960 20 Sheets-Sheet 1

PROCEED ONE EXTENSION INTERVAL-POSITION 2

INVENTOR:
WALTER M. JEFFERS,
BY D. Emmett Thompson
HIS ATTORNEY.

Aug. 25, 1964  W. M. JEFFERS  3,146,421
TRAFFIC SIGNAL CONTROLLER
Filed Aug. 4, 1960  20 Sheets-Sheet 2

PROCEED ONE EXTENSION INTERVAL—POSITION 2—
DETECTOR TWO ACTUATED

INVENTOR:
WALTER M. JEFFERS,
BY D. Emmett Thompson
HIS ATTORNEY.

Aug. 25, 1964  W. M. JEFFERS  3,146,421
TRAFFIC SIGNAL CONTROLLER
Filed Aug. 4, 1960  20 Sheets-Sheet 3

CLEARANCE ONE INTERVAL – RUNNING FROM
POSITION 2 TO 3

INVENTOR:
WALTER M. JEFFERS,
BY D. Emmett Thompson
HIS ATTORNEY.

Aug. 25, 1964     W. M. JEFFERS     3,146,421

TRAFFIC SIGNAL CONTROLLER

Filed Aug. 4, 1960     20 Sheets-Sheet 4

CLEARANCE ONE INTERVAL – POSITION 3

INVENTOR:
WALTER M. JEFFERS:

BY *D. Emmett Thompson*

HIS ATTORNEY.

Aug. 25, 1964

W. M. JEFFERS 3,146,421

TRAFFIC SIGNAL CONTROLLER

Filed Aug. 4, 1960

PROCEED TWO INITIAL INTERVAL-POSITION 4

INVENTOR:
WALTER M. JEFFERS,
BY D. Emmett Thompson
HIS ATTORNEY.

PROCEED TWO EXTENSION INTERVAL-POSITION 5

INVENTOR:
WALTER M. JEFFERS,
BY D. Emmett Thompson
HIS ATTORNEY.

Aug. 25, 1964 — W. M. JEFFERS — 3,146,421
TRAFFIC SIGNAL CONTROLLER
Filed Aug. 4, 1960 — 20 Sheets-Sheet 7

PROCEED TWO EXTENSION INTERVAL – POSITION 5
DETECTOR THREE ACTUATED

INVENTOR:
WALTER M. JEFFERS,
BY D. Emmett Thompson
HIS ATTORNEY.

Aug. 25, 1964 W. M. JEFFERS 3,146,421
TRAFFIC SIGNAL CONTROLLER
Filed Aug. 4, 1960 20 Sheets-Sheet 8

CLEARANCE TWO INTERVAL – POSITION 6

INVENTOR:
WALTER M. JEFFERS,
BY D. Emmett Thompson
HIS ATTORNEY.

Aug. 25, 1964  W. M. JEFFERS  3,146,421
TRAFFIC SIGNAL CONTROLLER
Filed Aug. 4, 1960  20 Sheets-Sheet 9

PROCEED THREE INITIAL INTERVAL – POSITION 7

INVENTOR:
WALTER M. JEFFERS,
BY D. Emmett Thompson
HIS ATTORNEY.

PROCEED THREE EXTENSION INTERVAL—POSITION 8

INVENTOR:
WALTER M. JEFFERS,

PROCEED THREE EXTENSION INTERVAL — DETECTOR
ONE ACTUATED — RUNNING FROM POSITION 8 TO 9

INVENTOR:
WALTER M. JEFFERS,
BY *D. Emmett Thompson,*
HIS ATTORNEY.

Aug. 25, 1964    W. M. JEFFERS    3,146,421
TRAFFIC SIGNAL CONTROLLER
Filed Aug. 4, 1960    20 Sheets-Sheet 12

CLEARANCE THREE INTERVAL – POSITION 9

INVENTOR:
WALTER M. JEFFERS,
BY D. Emmett Thompson,
HIS ATTORNEY.

PROCEED ONE INITIAL INTERVAL–POSITION 1

INVENTOR:
WALTER M. JEFFERS,
BY D. Emmett Thompson,
HIS ATTORNEY.

Aug. 25, 1964    W. M. JEFFERS    3,146,421
TRAFFIC SIGNAL CONTROLLER
Filed Aug. 4, 1960    20 Sheets-Sheet 14

PROCEED ONE EXTENSION INTERVAL -POSITION 2 -
DETECTOR ONE CONTINUOUSLY ACTUATED, DETECTOR
THREE MOMENTARILY ACTUATED

INVENTOR:
WALTER M. JEFFERS,
BY D. Emmett Thompson,
HIS ATTORNEY.

PROCEED ONE EXTENSION INTERVAL – POSITION 2 – MAXIMUN TIMER ENERGIZED

INVENTOR:
WALTER M. JEFFERS,
BY D. Emmett Thompson
HIS ATTORNEY.

Aug. 25, 1964

W. M. JEFFERS 3,146,421

TRAFFIC SIGNAL CONTROLLER

Filed Aug. 4, 1960

CLEARANCE ONE INTERVAL – POSITION 3

INVENTOR:
WALTER M. JEFFERS,

BY D. Emmett Thompson

HIS ATTORNEY.

Aug. 25, 1964  W. M. JEFFERS  3,146,421
TRAFFIC SIGNAL CONTROLLER
Filed Aug. 4, 1960  20 Sheets-Sheet 17

MOVEMENT TWO SKIP CIRCUIT ENERGIZED—
RUNNING FROM POSITION 3 TO 4

INVENTOR:
WALTER M. JEFFERS,
BY D. Emmett Thompson,
HIS ATTORNEY.

Aug. 25, 1964  W. M. JEFFERS  3,146,421
TRAFFIC SIGNAL CONTROLLER
Filed Aug. 4, 1960  20 Sheets-Sheet 18

PROCEED THREE (MOVEMENT TWO SKIPPED)—
RUNNING FROM POSITION 4 TO 7

INVENTOR:
WALTER M. JEFFERS,
BY D. Emmett Thompson,
HIS ATTORNEY.

INVENTOR:
WALTER M. JEFFERS,
BY D. Emmett Thompson
HIS ATTORNEY.

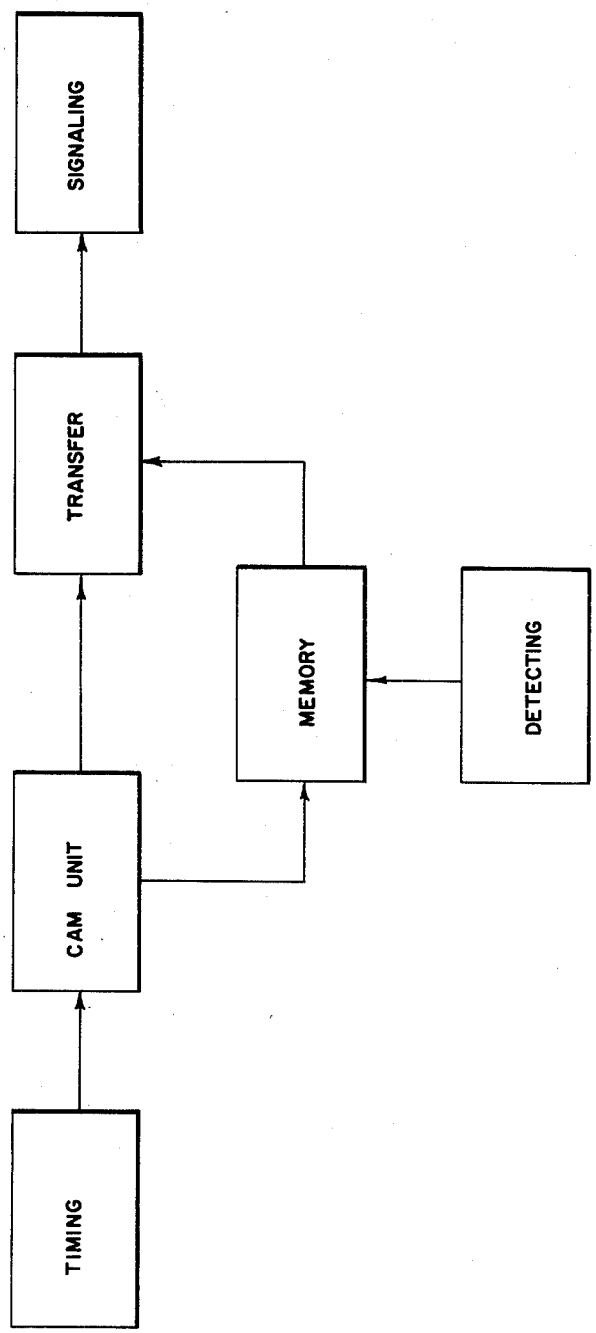

United States Patent Office 3,146,421
Patented Aug. 25, 1964

3,146,421
TRAFFIC SIGNAL CONTROLLER
Walter M. Jeffers, Syracuse, N.Y., assignor to Crouse-Hinds Company, Syracuse, N.Y., a corporation of New York
Filed Aug. 4, 1960, Ser. No. 47,492
1 Claim. (Cl. 340—37)

This invention relates to and has as an object a new and improved traffic signal controller. More specifically it is the principal object of this invention to provide a new ad improved three-movement full actuated traffic signal controller.

The term "full actuated" means that the traffic signal controller operation is initiated through its cycles of operation solely by the detection of a vehicle in each of the streets or lanes controlled by the traffic signal controller. The term "three-movement" means that the controller controls the movement of traffic in three streets, or lanes. In one application the controller may be used at a Y-intersection wherein each leg of the Y constitutes a traffic lane controlled by the controller.

Heretofore it has been customary to make a traffic count and survey of traffic moving in the lanes and the controller is set up so that upon continuous approach of traffic on all three lanes effects a display of the proceed, clearance and stop signals to the lanes in a pre-determined sequence. In other words, the lanes may be referred to as lane one, lane two, and lane three, and the desired sequence of signal display may be in that order, all to the end of effecting the most efficient movement to traffic through the signalized area.

In such controllers now in use provision was made for varying the sequential operation if the flow of traffic became uneven or intermittent in some of the lanes. For example, during display of the proceed or clearance signal to lane one the flow of traffic actuated the detector in lane three, and there was no detector actuation in lane two during that period, the controller would skip the display of the proceed signal to lane two and present the proceed signal to lane three. This arrangement was, of course, employed on the theory that if traffic was approaching on lane three and there was no traffic on lane two, it would be more desirable to skip lane two and next display the proceed signal to lane three, and this happened regardless of a subsequent actuation in lane two during the display of the clearance signal in lane one. This arrangement is satisfactory in the absence of any traffic on the next sequential lane, which in this example is lane two, however, it has been determined by traffic engineers that this arrangement is undesirable if traffic does approach on lane two during the display of the clearance signal to lane one.

This invention has as a more specific object a full actuated three-movement traffic signal controller which is operable upon continuous actuation of the detectors in the first, second and third lanes of traffic, to display the signal sequence to the first, second and third lanes, the controller including an arrangement operable upon actuation in the second lane during the display of the clearance signal to the first lane, to next display the proceed and clearance signals to said second lane, regardless of a previous actuation in the third lane, during the display of the proceed or clearance signal to the first lane. In other words, the controller is operable to maintain a pre-determined sequential display of the signals to the lanes if actuation takes place in the next sequential lane during display of the clearance signal in the lane then having a "right-of-way."

It is an additional object of this invention to provide a full actuated three-movement signal controller wherein the signals are normally energized directly through signal cam contacts in the unit, and wherein the said signals are energized through the contacts of signal relays only in the event where the signal display sequence to a particular movement is to be skipped, due to the absence of vehicle actuation on that movement. As used in the specification and claims the word "phase" means that part of the traffic signal cycle serving a particular traffic movement with a proceed period followed by a clearance period, such a sequence being termed a "right-of-way" signal display sequence. The term "phase" will be used interchangeably with the term "movement," both words having the same meaning. For clarity of description, as actuation of the detection means by a vehicle on one of the traffic movements forming the intersection will be referred to as a "call" or "demand," to mean that the controller is called by such an actuation to present the proceed and clearance signal display sequence to that movement.

The controller embodying the preferred invention incorporates a cam unit of the type shown and described in my prior Patent 2,751,574, issued June 19, 1956. The cam unit, as described in that patent comprises a cam shaft having a plurality of cam members mounted thereon and a plurality of contacts associated with the cam members whereby upon rotation of the cam shaft the cam members close the contacts in a predetermined order or sequence.

The invention consists in the novel features and in the combinations and constructions hereinafter set forth and claimed.

In describing this invention reference is had to the accompanying drawings, in which like characters designate corresponding parts in all the views.

In the drawings:

FIGURES 1 to 18, inclusive, are circuit diagrams of the traffic signal controller comprising the preferred embodiment of the invention wherein the heavy lines indicate the portions of the circuit then conducting current, these figures showing the controller in the various stages of operation.

FIGURE 21 is a block function diagram of the invention.

Figure 20:
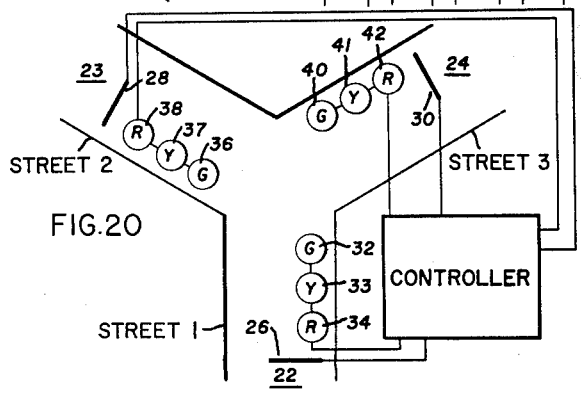
FIGURE 20 is a diagrammatic illustration showing a simple form of intersection with which the controller, comprising the invention, may be used.

Referring first to FIGURE 20, a Y-intersection is shown made up of a first street 22, a second street 23, and a third street 24. As used hereinafter the streets 22, 23, and 24, will be referred to as traffic movements one, two, and three respectively. Street 22, or traffic movement one, is provided with vehicle detection means 26, illustrated diagrammatically, as being of the pressure type. Streets 23, 24, are also shown as being provided with similar detection means, 28, 30. It is to be understood that any suitable type of detection means may be used and the example of pressure detectors is to be considered in no manner as limiting the invention.

Street 22 is provided with a plurality of traffic signals 32, 33, 34, being the conventional green, yellow and red signals, as is indicated by the letters G, Y, and R. Similarly street 23 is provided with signals 36, 37, 38, and street 24 is provided with the signals 40, 41, 42.

Figure 19:
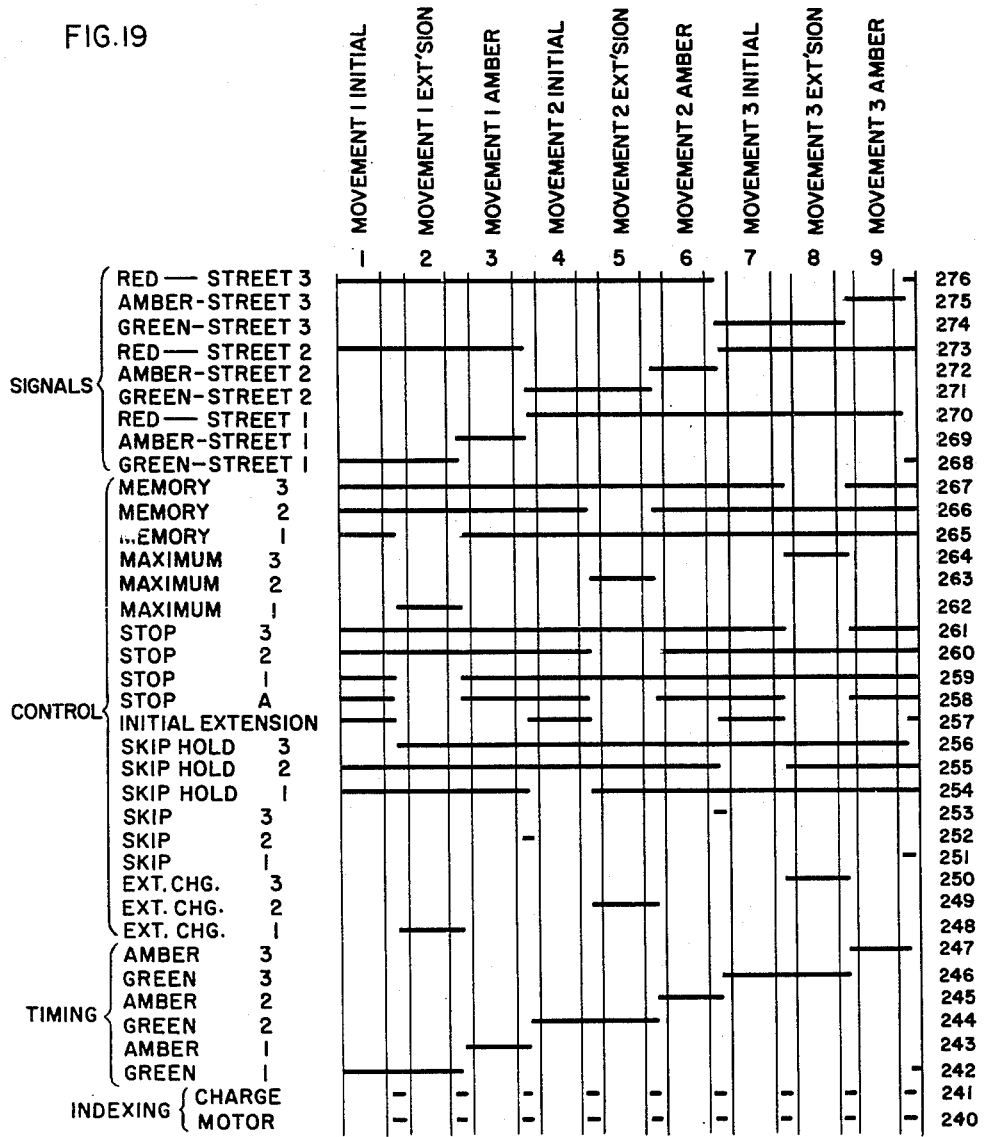
FIGURE 19 is a cam sequence chart showing which cam unit contacts close for each position of the cam shaft (reference must be made to the fact that the controller embodies a cam unit similar to that disclosed in prior patents).

In FIGURE 19 the horizontal heavy lines indicate the positions of the cam unit in which the various cam contacts are closed, the number and name of the contacts being indicated to the left of the figure. The name and number of the various positions or intervals of the cam shaft are indicated across the top of the figure, the cam unit having nine positions or intervals with a space between each interval, and this space is used to indicate the spin movement of the cam shaft from one interval to the next. Unless otherwise described hereinafter, the cam shaft rests in each interval for a predetermined amount of time as will be more fully described.

Figure 1:
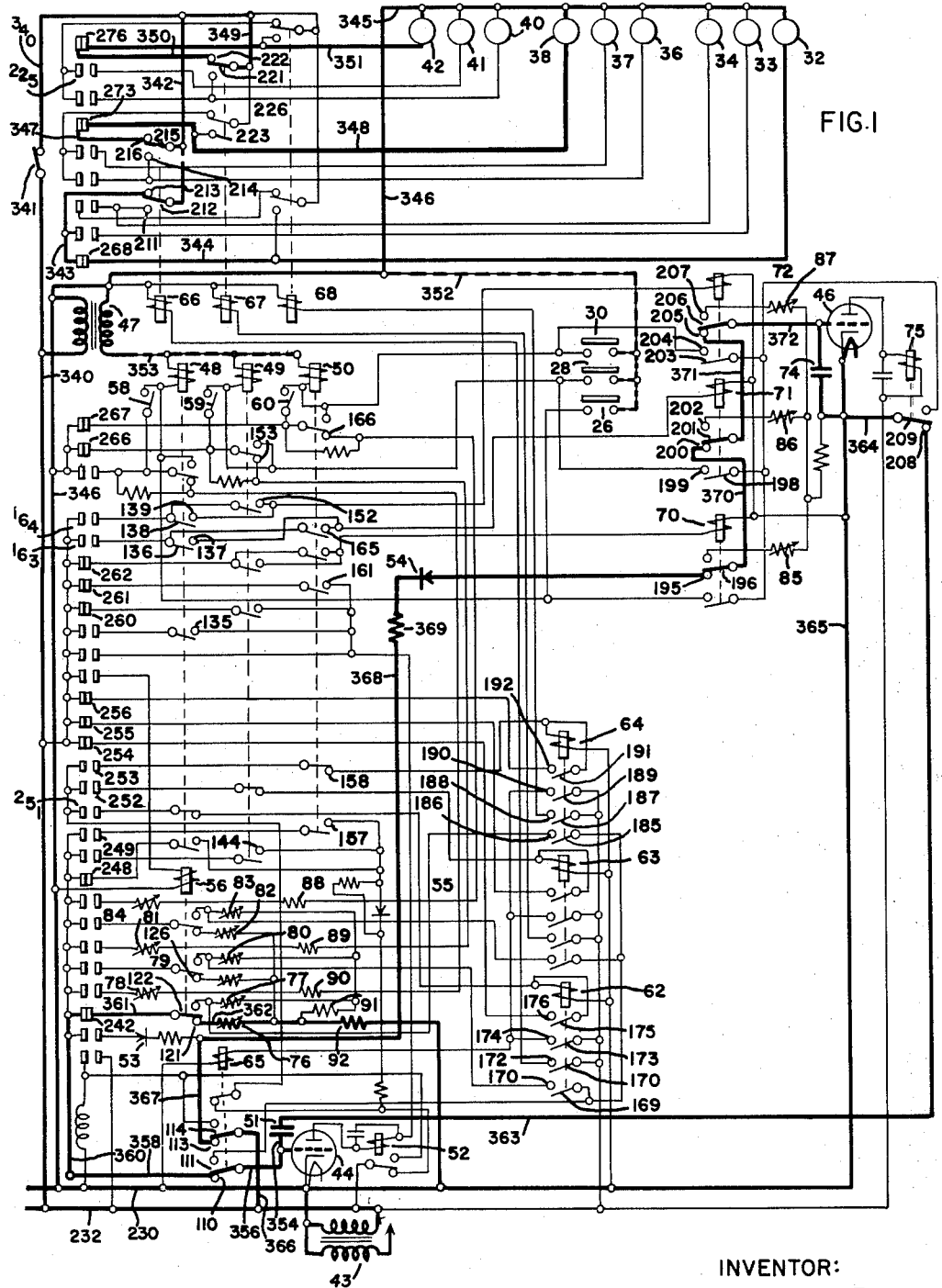

The schematic circuit diagram of the controller, as shown in FIGURE 1, includes a tube filament, or heater, transformer 43, for heating the cathodes of the timing tube 44 of the main timer portion of the controller located at the lower left in FIGURE 1, and of the maximum timer located at the upper right of FIGURE 1. The controller is also provided with a detector transformer 47 having its secondary connected to the coils of detector or memory relays, 48, 49, 50. The main timer, located at the left side of FIGURE 1, is provided with a timing capacitor 51, and a relay 52, as well as a reset rectifier 53. The controller is also provided with an extension reset rectifier 55.

An initial extension relay 56 is provided to permit the controller to switch from an initial timing interval to an extension timing interval for each movement, the initial and extension intervals comprising the total interval during which the proceed signal is displaced to each traffic movement.

The controller is provided with three recall switches 58, 59, 60, which function, when closed, to recall the traffic signal controller so as to always return the proceed signal display to the particular traffic movement associated with the closed recall switch as will be more fully described hereinafter.

Three skip interval relays 62, 63, 64, are provided to permit the skipping of the signal display sequence to a traffic movement when there is no call on the traffic movement. A skip-charge relay 65, operates in conjunction with the skip interval relays 62 to 64, inclusive, and three skip signal relays 66, 67, 68, to effect the skipping of the signal display sequence to any particular traffic movement, as will be more fully described hereinafter.

The controller is provided with three maximum timer control relays 70, 71, 72, as well as a maximum timing capacitor 74, and a maximum timer plate relay 75, all for a purpose to be hereinafter described.

The main timer is provided with a plurality of adjustable resistors 76 to 84, inclusive, to permit adjustment of the time for both the initial and extension intervals of the proceed, as well as the clearance signal intervals, on each of the traffic movements.

The maximum timer is provided with three adjustable resistors 85, 86, 87, to permit the variation of the maximum amount of time that the green signal is displayed to each of the three movements.

The resistors 88 to 92, inclusive, are provided in the main timer to give a fixed maximum setting for the signal display intervals with which they are associated.

The skip charge relay 65 is provided with five fixed contact points 110, 112, 113, 115, 116, and armatures 111, 114, 117. The main timer plate relay 52 is provided with a fixed contact point 118, and armature 119, and a fixed contact 120. The initial extension relay 56 is provided with a plurality of fixed contacts and movable armatures 121 to 129, inclusive. The Detector relays 48, 49, 50, are provided with a plurality of fixed contacts and movable armatures 130 to 168, inclusive. The skip interval relays 62, 63, 64, are provided with a plurality of fixed contacts and movable armature sets 169 to 192, inclusive. The maximum timer control relays 70, 71, 72, are provided with a plurality of fixed contacts and movable armature sets 193 to 207, inclusive. The maximum timer plate relay 75 is provided with a fixed contact 208, and movable armature 209, and fixed contact 210. The skip signal relays 66, 67, 68, are provided with a plurality of fixed contacts and movable armatures 211 to 228, inclusive.

The controller is provided with a conventional type 120 volt 60 cycle alternating current power supply having a hot line 232, and a common, or return line 230, and a cam unit of the type referred to in the patent is provided with a motor coil 234, and 36 pairs of contacts which are closed by the rotation of the cam shaft as indicated by the cam sequence chart shown in FIGURE 19. The pairs of contacts are identified by the reference numerals 240 to 276, inclusive.

The contacts 240, 241, are the motor and charge contacts for the cam unit and serve to index the cam unit.

The contacts 242 to 247, are the timing contacts which serve to time the various pretimed signal display intervals of the controller.

The contacts 248 to 267, are control contacts which serve to control the various features of operation of the controller.

The contacts 268 to 276, inclusive, are signal contacts which serve to connect the signals to the source of power to energize the signals.

*Normal Controller Operation*

In the position shown in FIGURE 1, the heavy lines indicate the portions of the circuit conducting current. This is the "rest" or "hold" position of the controller and is position two, which is the extension interval for the proceed signal on movement number one, as shown on the cam sequence chart in FIGURE 19. In this position contacts 242, 248, 254, 255, 256, 260, 261, 262, 266, 267, 268, 273, 276, are closed. For purposes of illustration and description the controller is shown as starting from this position, and has the green, or proceed, signal 32, displayed to the movement number one on street 22. This circuit comprises hot line 232, line 340, connected through the normally closed signal shut-down switch 341, line 342, armature 212, and fixed contact point 213 on relay 66, line 343, closed contacts 268, line 344, signal 32, to a bus ground line 345, connected by line 346, to the common line 230. The stop signal 38 is energized to display the stop indication to movement two through the circuit comprising hot line 232, line 340, line 342, armature 215, fixed contact point 216 of relay 66, line 347, closed contacts 273, line 348 which is connected through signal 38 to the bus return or ground line 345. The signal 42 is energized from hot line 340, through line 349, armature 221, fixed contact point 222 of relay 67, line 350, closed contacts 276, line 351 which is connected through the signal 42 to the bus return line 345.

The dashed heavy line 352, connected as shown to one side of the detectors 26, 28, 30, and the dashed heavy line 353, connected through the secondary of the transformer 47 to one side of the detector relays 48, 49, 50, indicates that the controller is in a potential position for operation by the actuation of any one of the detectors 26, 28, 30.

Accordingly, it is assumed for purposes of description, that the controller has just entered position two. The main timing capacitor 51 is discharging through the circuit comprising line 354, line 356, armature 111, fixed contact 110 of the skip charge relay 65, line 358, line 360, closed contacts 242, line 361, armature 122, fixed contact 121 of the initial extension relay 56, line 362, through the variable resistor 76 and the fixed resistor 92, to the common return line 230, and the opposite side of the capacitor 51 is connected by line 363 through the fixed contact 208 and armature 209 of the maximum timer plate relay 75 to line 364 which is connected to line 365 which, in turn, is connected to the common return line 230, this circuit being the complete discharge circuit for the capacitor.

A high negative voltage is held on the grid of the maximum timing capacitor 74 through a circuit comprising hot line 232, line 366, armature 114, fixed contact 113 of relay 65, line 367, to line 368, which is connected through a fixed resistor 369, and the rectifier 54 to the fixed contact 195, armature 196, line 370, fixed contact 200, armature 201, line 371, fixed contact 205, armature 206, to line 372 which is connected to the grid of the tube 246, the bottom of the capacitor 74 being connected to ground by lines 364, 365. Thus the maximum timer is being held in a reset position and cannot function.

When the timing capacitor 51 becomes completely discharged the grid which is connected by line 356 to the top side of the capacitor 51 will be at, or near, ground potential and the tube 44 is in a condition to conduct current. No plate current will flow, however, because the plate circuit is open and in absence of any actuation on either of the detectors 28, 20, the controller will remain indefinitely in this condition.

Figure 2:
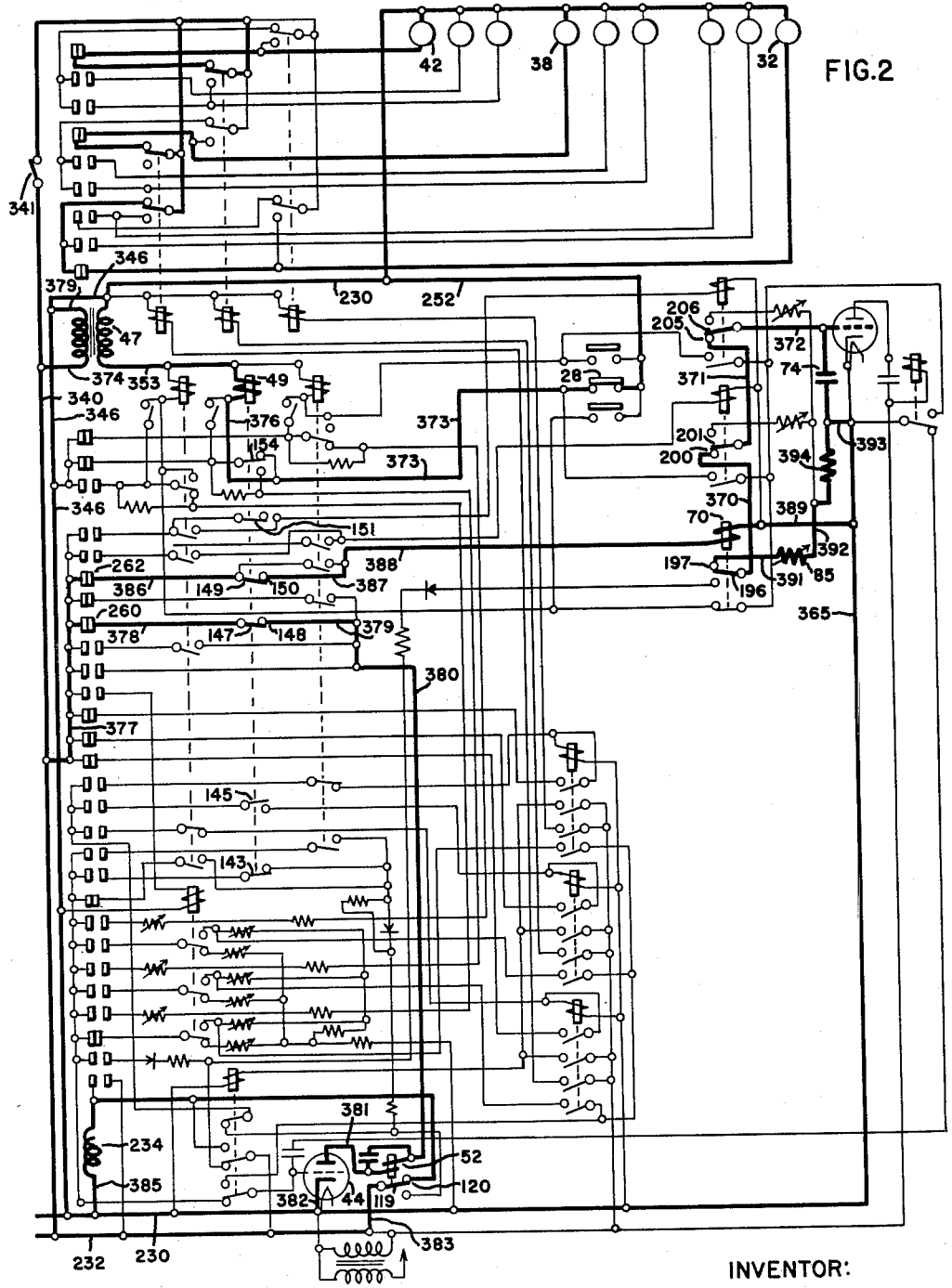

Referring now to FIGURE 2. The controller circuit condition is shown immediately following an actuation of the detector 28, in the number two traffic movement. As shown in the figure, the closing of the detector 28 completes a circuit to one side of the coil of detector relay 49, via line 373. The detector transformer pirmary is provided with power through line 340, connected by line 374, to one side of the primary of the transformer 47, the opposite side of which is connected to line 379, which is connected by line 346 to the common return line 230. The closing of the detector 28 completes the circuit from the secondary of the transformer 47, through line 353, coil of relay 49, line 376, line 373, detector 28, and line 352 which is connected by line 346 to the common return line 230. This circuit energizes relay 49 and causes the armatures 154, 151, 149, 147, 145, 143, to move to the position indicated in FIGURE 2. A circuit is completed by the energization of relay 49 from the hot line 232, through line 340, bus line 377, closed contacts 260, line 378, armature 147, fixed contact 148, line 379, line 380, coil of relay 52, line 381, to the plate of the control tube 44. The tube 44 now passes current to complete the plate circuit through the cathode of tube 44, and line 382 which is connected to the common return line 230, thus energizing relay 52. The capacitor across the coil relay 52 functions to smooth out the half-wave pulsations and prevent relay contact chatter. The energization of relay 52 moves the armature 119 into engagement with the fixed contact 120 thus completing a circuit from hot line 232, through line 383, which is connected by the line 389 through the cam unit motor coil 234, and by line 385 to the common return line 230. This circuit is a "spin" circuit and serves to energize the cam unit motor to index the cam unit to the next position.

In position two, as shown in FIGURE 2, the energization of relay 49 also completes the circuit from the hot bus line 377, closed contacts 262, line 386, armature 149, fixed contact 150, line 387 to line 388, which is connected through the coil of the maximum timer control relay 70 for traffic movement number one, to line 389 and line 365 to the common return line 230, thereby energizing relay 70. The energization of the relay 70 starts the discharge of the maximum timing capacitor 74 through the circuit comprising line 372, armature 206, contact 205, line 371, armature 201, contact 200, line 370, armature 196, fixed contact 197, line 391, adjustable resistor 394 to line 365 and to the common return line 230. The time it takes for the capacitor 74 to discharge determines the maximum time that the green signal 32 is energized for display to traffic movement number one in the event of continuous traffic in this movement.

Figure 3:
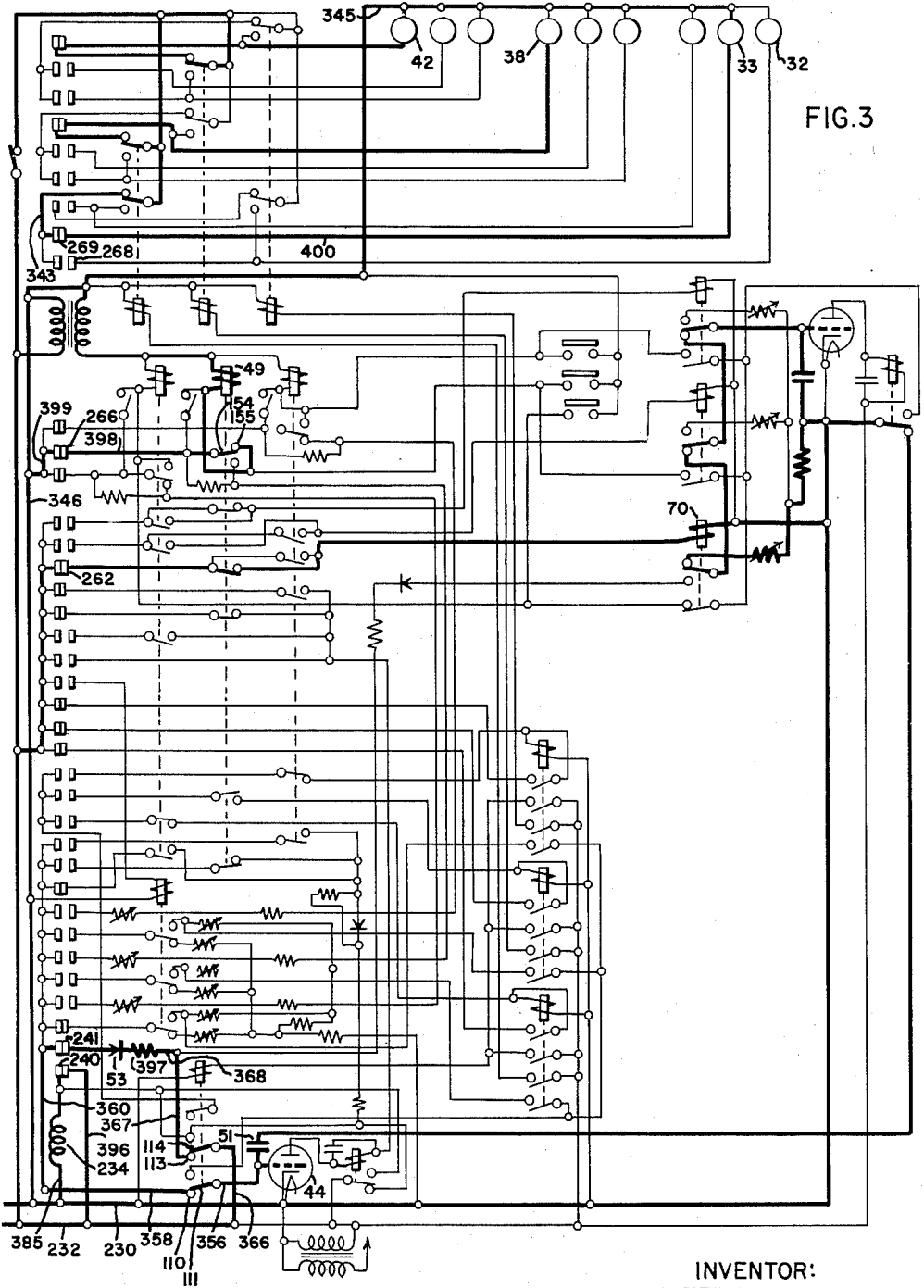

FIGURE 3 shows the controller circuits with the cam unit running or indexing from position 2, as shown in FIGURES 1 and 2, to position 3, which will be shown and described in connection with FIGURE 4. In FIGURE 3, and as indicated on the cam sequence chart, FIGURE 19, when the motor of the cam unit is energized and starts to spin or index, the motor and charge contacts 240, 241, respectively, are closed to ensure that the cam unit will be completely indexed from position 2 to position 3. The closure of the motor contacts 240 completes a circuit from the hot line 232 through the line 396, closed contacts 240, motor coil 234, to line 385 which is connected to the common return line 230, thus energizing the motor coil until the contacts 240 are opened when the cam unit reaches position 3. The closing of the charge contacts 241 completes the charge circuit from the hot line 232, line 366, armature 114, fixed contact 113, line 367, line 368, through a fixed resistor 397, rectifier 53, closed contacts 241, line 360, line 358, fixed contact 110, armature 111, to line 356 which is connected to the top side of the capacitor 51, thereby re-charging the capacitor 51. The charging of the capacitor 51 provides the grid of tube 44, which is connected by line 356 to the top side of the capacitor 51, with a high negative potential, thus preventing the tube from conducting current and de-energizing relay 52. The relay 49 is held closed, however, through the contacts 155, 154, and line 398, which is connected through the closed memory contacts 266, and line 399, which is connected to the common or return line 230 by the line 346. The relay 70 is held energized through the closed contacts 262 and the circuit previously described, so as to permit the maximum timer to continue to operate.

In FIGURE 3 the contacts 268 have opened while the contacts 269 have closed, thereby de-energizing the circuit for the green or proceed signal 32, and energizing the amber or clearance signal 33, through the circuit comprising bus line 343, closed contacts 269, line 400 and signal 33 which is connected to the common bus line 345, thus changing the signal on the street number one from proceed to clearance. The red signals for streets two and three are maintained energized as indicated in FIGURE 3.

Figure 4:
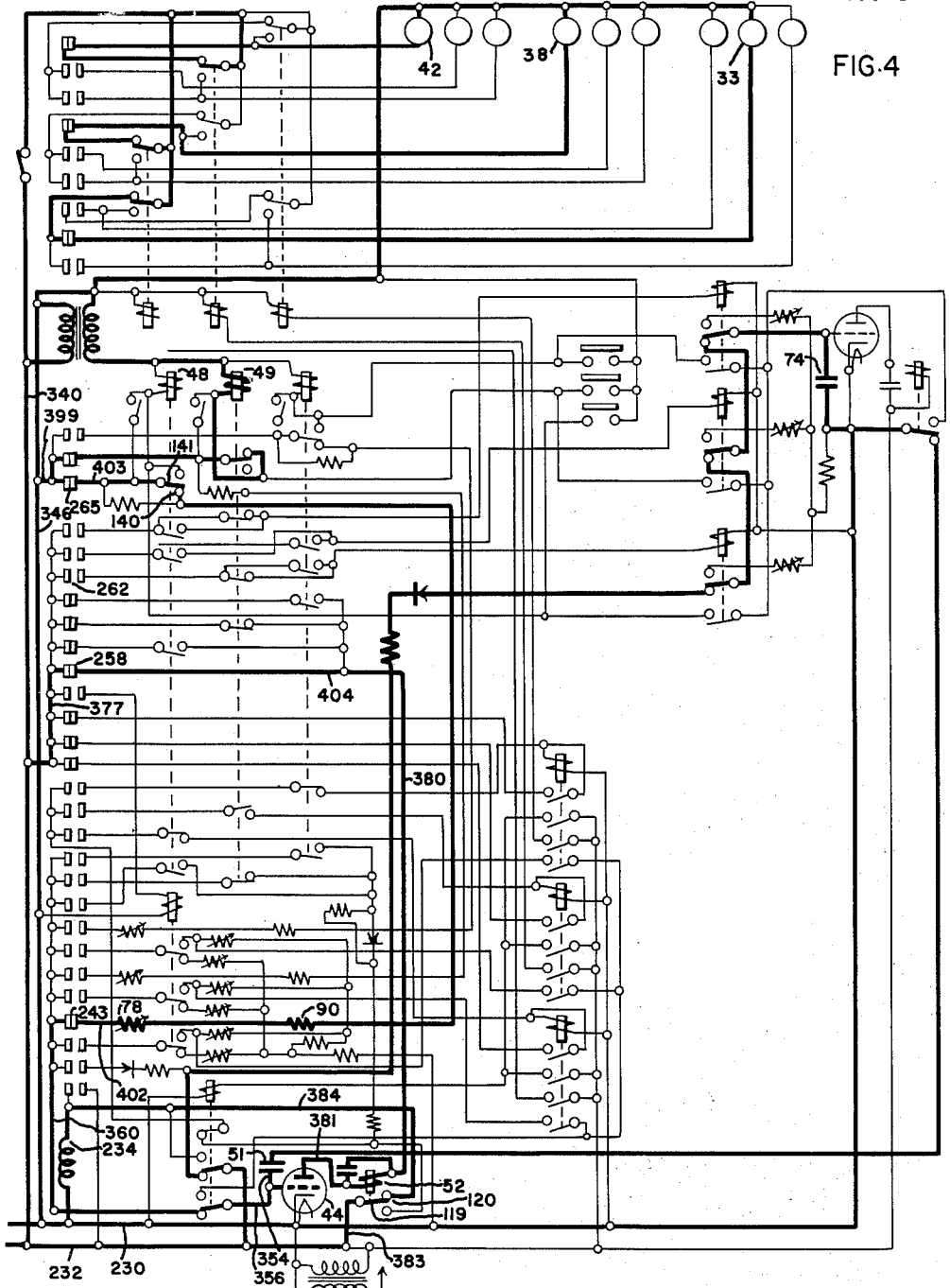

The timing of the amber or clearance signal 33 for traffic movement number one takes place in position 3 of the cam unit and the circuits for the controller in this position are indicated in FIGURE 4. In this figure the contacts 262 are opened thereby halting the discharge of capacitor 74 and re-charging the capacitor, thus resetting the maximum timer. Relay 49 is still energized but has no effect on the operation of the controller. The main timing capacitor 51, is being discharged through the circuit comprising line 354, line 356, contacts 111 and 110, line 358, line 360, closed contacts 243, line 402, through variable resistor 78, fixed resistor 90, contacts 140, 141, on relay 48, line 403, through closed contacts 265, line 399 to line 346, which is connected to the common or return line 230. The resistor 78 is variable and the setting of this resistor determines the length of the clearance interval for movement number one.

The plate circuit of the tube 44 is operative when the capacitor 51 is discharged to the point where the grid bias of the tube becomes sufficiently low to permit the tube to conduct through line 381, coil of relay 52, line 380 to line 404, which is connected through the closed contacts 258 to the bus line 377, which is in turn connected through the closed contacts 258 to the bus line 377, which is connected by the line 340 to the hot line 232. This circuit energizes the relay 52 to complete the "spin" circuit through the motor coil 234 of the cam unit to end the clearance interval. The "spin" circuit for the motor coil comprises line 383, which is connected to the hot line 232, contacts 119, 120, line 384, motor coil 234, and line 385, which is connected to the common line 230. The cam unit then indexes through the spin interval from position 3 to position 4 with a sequence of operations similar to that described in connection with FIGURE 3.

Figure 5:
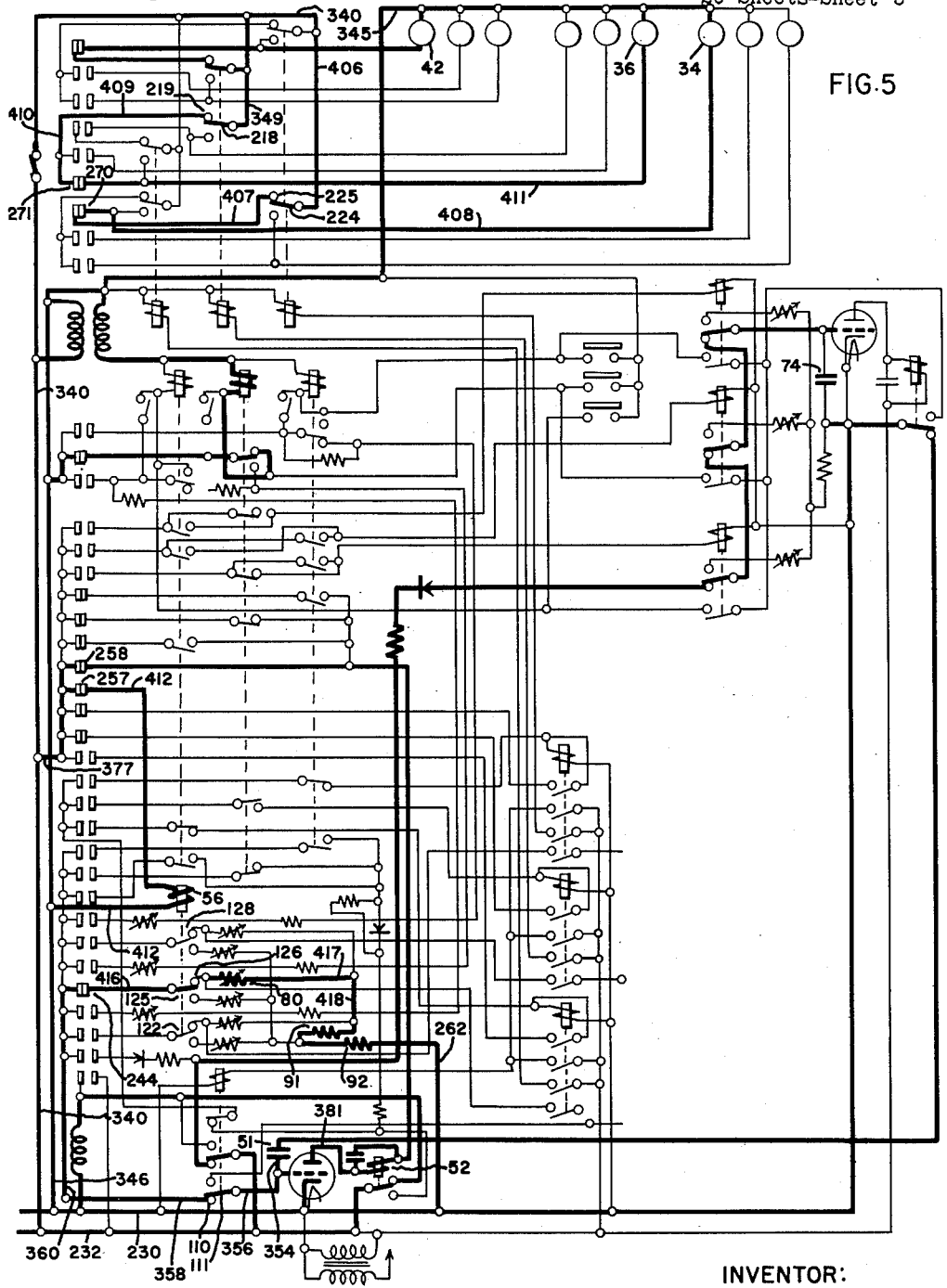

FIGURE 5 shows the condition of the circuits of the controller in position 4, in which position the controller is timing the interval of the initial proceed or green signal display to traffic movement number two. As seen in the figure the stop, or red, signal 34 is energized for display to movement number one through a circuit comprising hot line 232, line 340, line 406, contacts 224, 225, line 407, closed contacts 270, line 408, signal 34, and bus return line 345. The green signal 36 is energized to display the proceed indication to traffic movement number two through the circuit comprising line 340, line 349, contacts 218, 219, line 409, line 410, closed contacts 271, line 411, signal 36, and bus return line 345.

Relay 49 remains energized in this position of the controller but does not effect any operation or change in the controller. The coil of the initial extension relay 56 is energized through a circuit comprising hot line 232, line 340, line 377, closed contacts 257, line 412, through the coil of relay 56, line 412, to the line 346 which is connected to the common return line 230. This circuit serves to energize the relay 56, and move the armatures 122, 125, 128, upward to the position shown in FIGURE 5. The main timing capacitor now discharges (having been fully charged during the spin interval between positions 3 and 4, as previously described) through the circuit comprising line 354, line 356, contacts 110, 111, line 358, line 360, closed contacts 244, line 416, contacts 125, 126, variable resistor 80, line 417, line 418, fixed resistors 91, 92, line 362 to the common return line 230. The setting of the variable resistor 80 determines the length of time that the proceed signal 36 is displayed to movement number two. The fixed resistors 91, 92, are provided in the circuit to guarantee a pre-determined minimum time for this intreval.

In position 4, as shown in FIGURE 5, the plate circuit of the control tube 44, is completed by the closing of the contacts 258 through the circuit previously described, so that when the capacitor 51 becomes completely discharged the plate relay 52 closes, as shown in FIGURE 5, completing the motor circuit previously described to index the cam unit to the next position. Also in position 4, the maximum timing capacitor 74 is maintained in the charged state through the circuit also previously described.

Figure 6:
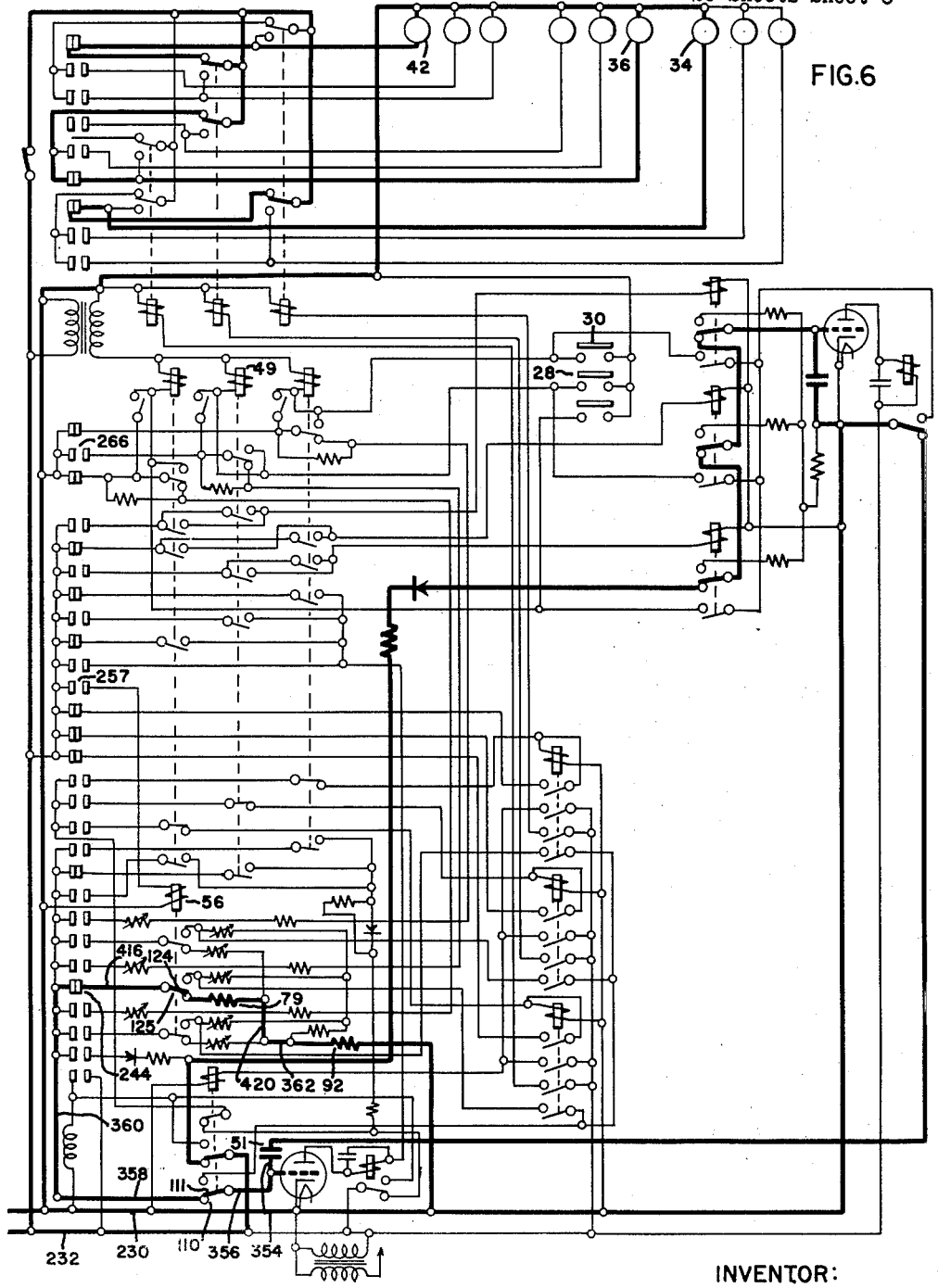

FIGURE 6 shows the controller circuit in position 5 which is the extension position for the green or proceed signal indication of traffic movement number two. In this position the green or proceed signal 36 continues to be displayed to movement number two through the circuit previously described.

The relay 49 has become de-energized by the opening of cam contacts 266. It would be re-energized momentarily by another actuation of detector 28 to produce an extension of the proceed signal indication as described in connection with movement number one. In order to simplify this description, however, it will be assumed that no such further actuation of the detector 28 occurs. Relay 56 is de-energized upon the opening of the cam contacts 257. The main timing capacitor 51, therefore, discharges through the circuit comprising line 354, line 356, contacts 110, 111, line 358, line 360, closed contacts 244, line 416, closed contacts 124, 125, adjustable resistor 79, line 420, line 362, fixed resistor 92, to the common return line 230. When the discharge of the capacitor 51, through this circuit is completed, however, nothing will happen because the plate circuit of the main timing tube 44 is open.

Figure 7:
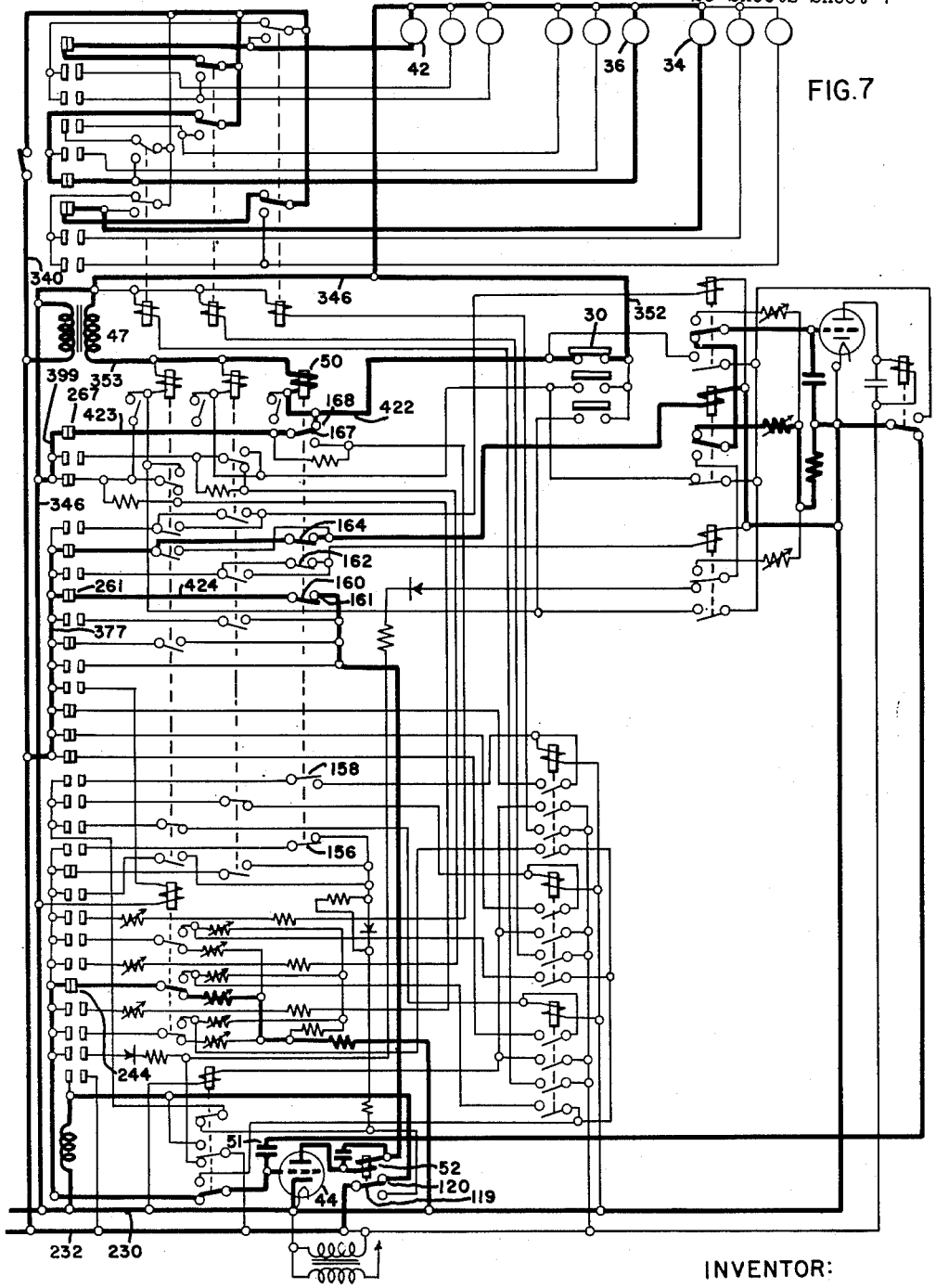

At this point if detector 30, in traffic movement number three, is momentarily actuated the condition of the controller circuit is changed from that shown in FIGURE 6 to that shown in FIGURE 7, in which condition the controller is in position 5, and is timing the extension interval for traffic movement number two. The actuation of the detector 30 energizes the relay 50 through the circuit comprising line 353, which is connected to the secondary of the detector transformer 47, relay coil 50, line 422, detector 30, line 353, and line 346 which is connected to the common return line 230. The energization of relay 50 moves the armatures 156, 158, 160, 162, 164, 167, upward to the position shown in FIGURE 7. The contact between the armature 167 and the fixed contact 168 provides a holding circuit to maintain the relay 50 in the energized condition, the coil of relay 50 being connected through the contacts 167, 168, line 423, closed contacts 267, line 399 to line 346 which is connected to the common return line 230. In the position shown in FIGURE 7, the plate circuit of the tube 44 is completed through the closed contacts 160, 161, line 424, closed contacts 261, and line 377, which is connected by line 340 to the hot line 232, thus energizing relay 52 and moving the armature 119 upwardly into engagement with the fixed contact 120. The energization of the relay 52 completes the motor or "spin" circuit previously described to index the cam unit to position 6 upon completion of the discharge of the capacitor 51, through the contacts 244, as described in connection with FIGURE 6.

Figure 8:
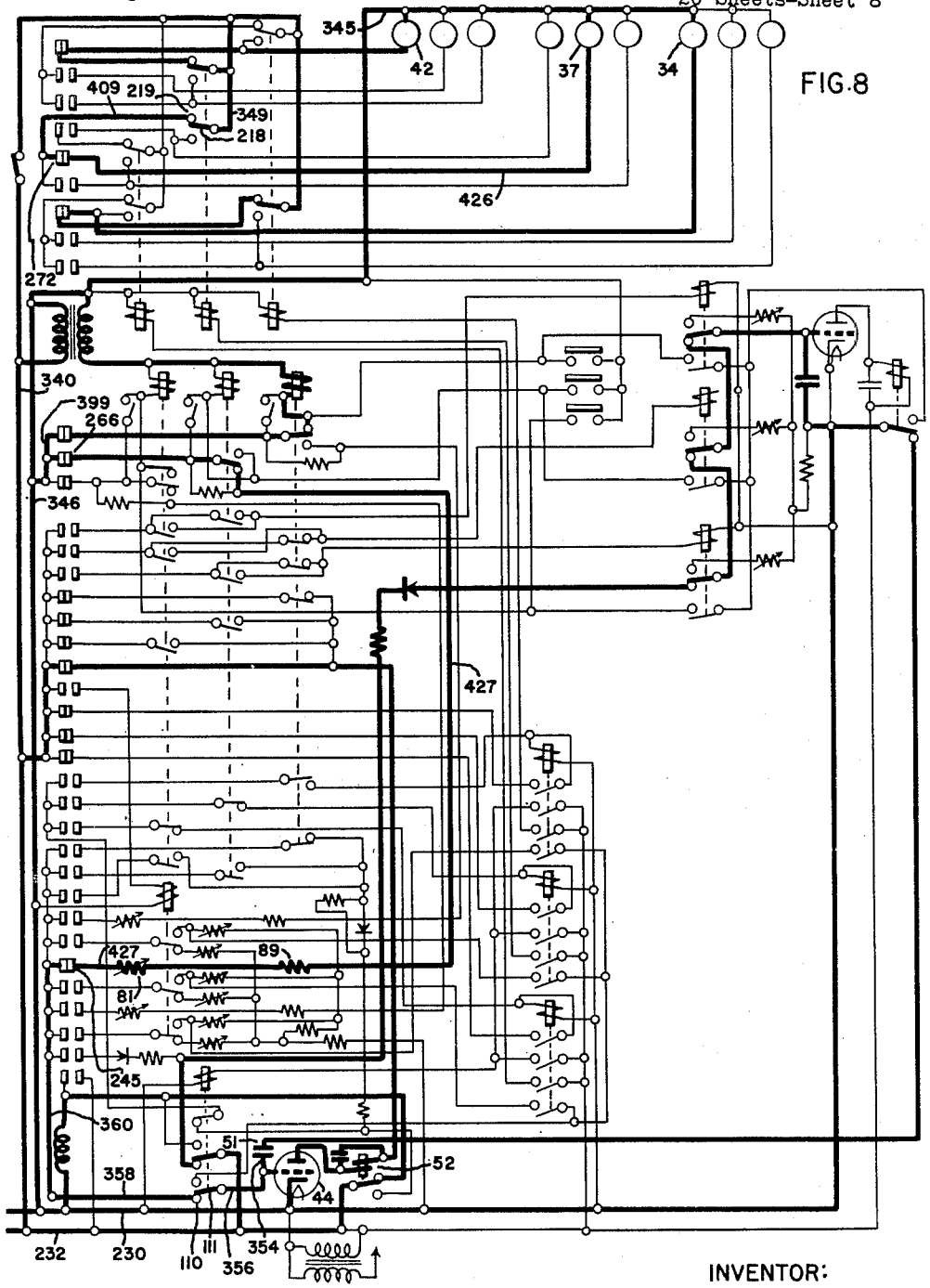

Position 6, which is the timing position for the clearance interval for movement number two, is shown in FIGURE 8. In that figure the signal 37 is energized through the circuit comprising hot line 232, line 340, line 349, closed contacts 218, 219, line 409, closed contacts 272, line 426, signal 37, and the common bus return line 345. The amount of time that the signal 37 is energized is controlled by the setting of the variable resistor 81, through which the main timing capacitor 51 is discharging. The discharge circuit for the capacitor 51 in this position, comprises line 354, line 356, closed contacts 110, 111, line 358, line 360, closed contacts 245, line 427, variable resistor 81, fixed resistor 89, closed contacts 153, 154, line 398, closed contacts 266, line 399, and line 346 which is connected to the common return line 230. In the manner previously described, when the capacitor has been completely discharged the tube 44 becomes conductive through the plate circuit to energize the relay 52 which, in turn, serves to index the cam unit to the next position, which is position 7.

Figure 9:
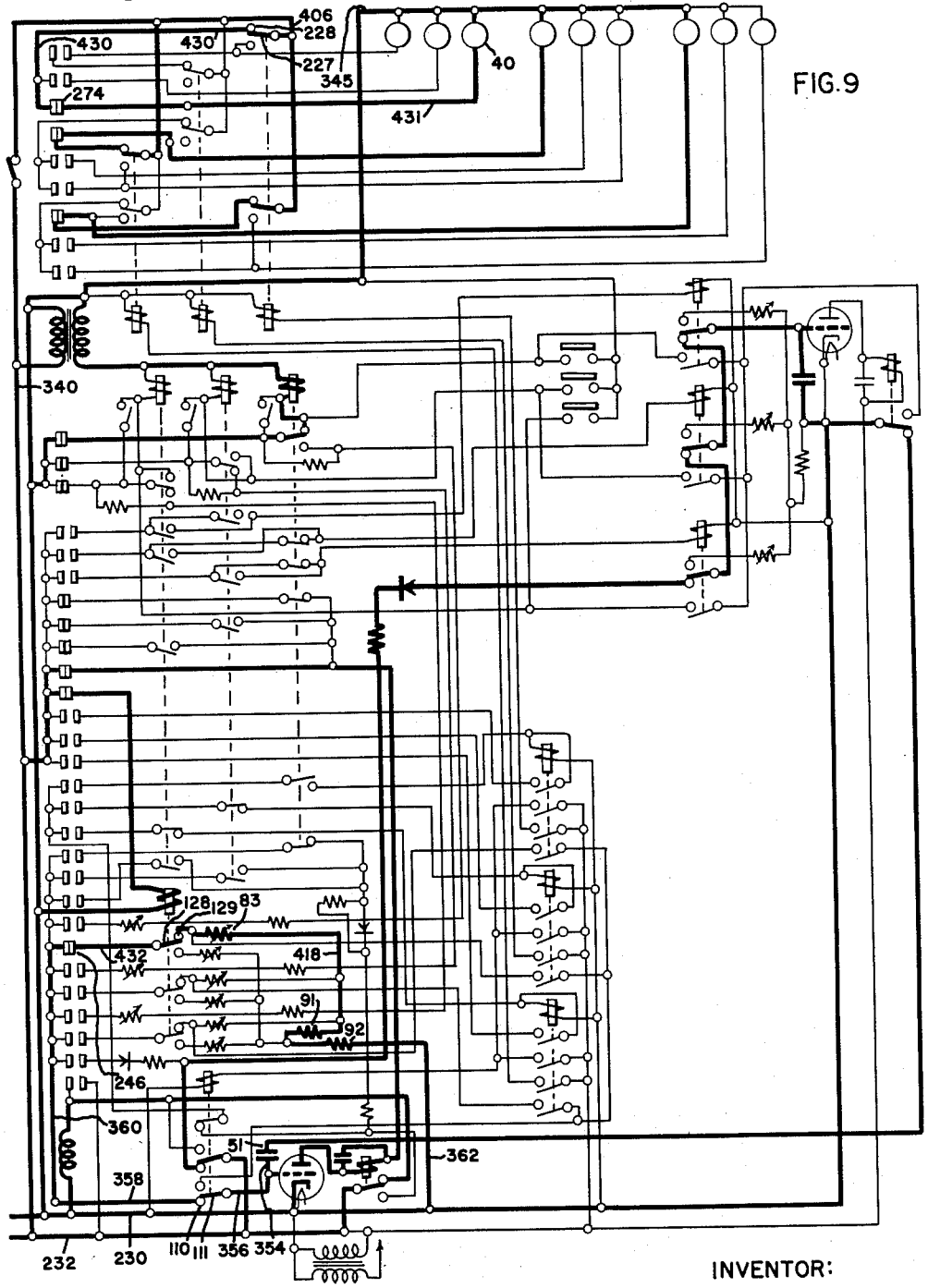

Position 7, as shown in FIGURE 9, is the timing position for the initial interval for presentation of the proceed signal to traffic movement number three. The signal 40 is energized in this position through the circuit comprising hot line 232, line 340, line 406, armature 227, contact 228, line 430, closed contacts 274, line 431, signal 40 and the common bus return line 345. Position 7 is similar to the initial timing of the proceed signal 36 on movement number two, as shown in FIGURE 5. In position 7, however, the capacitor 51 is discharging through the circuit comprising line 354, 356, closed contacts 110, 111, line 358, line 360, closed contacts 246, line 432, closed contacts 128, 129, adjustable resistor 83, line 418, fixed resistors 91, 92, and line 362 to the common return line 230.

Figure 10:
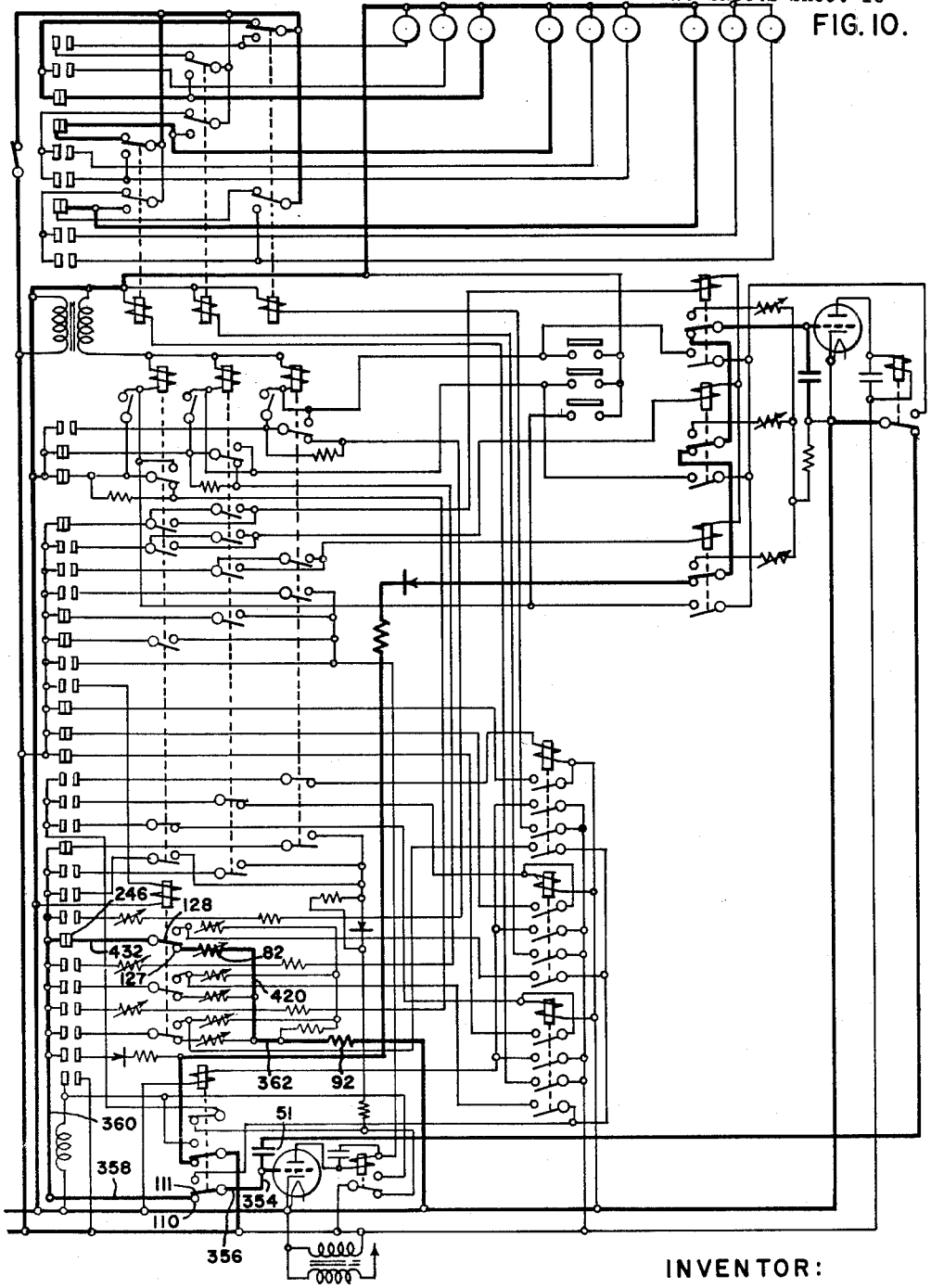

FIGURE 10 shows the controller in position 8, which is the extension timing interval for the proceed signal 40, being displayed to movement number three. This condition of the controller is similar to that shown in FIGURE 6, but in this position, however, capacitor 51 is discharging through the circuit comprising line 354, line 356, closed contacts 110, 111, line 358, line 360, closed contacts 246, line 432, closed contacts 128, 127, adjustable resistor 82, line 420, line 362 and fixed resistor 92 to the common return line 230.

Figure 11:
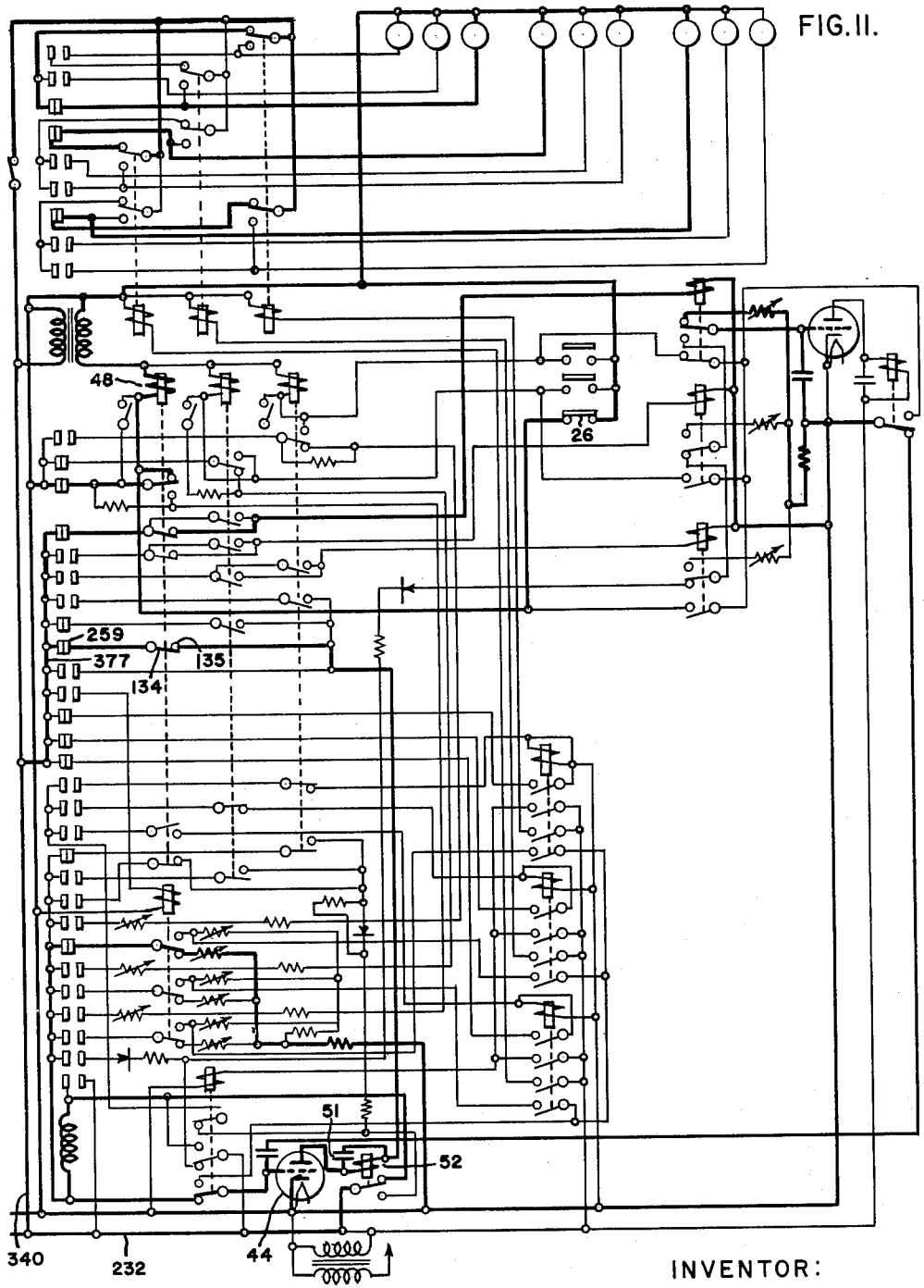

If, in this position, the detector 26 in movement number one is actuated, the controller circuit is in the condition shown in FIGURE 11. As previously described the closing of the detector 26 energizes and holds energized the relay 48. The plate circuit of the main timing tube 44 is completed by the closing of the contacts 134, 135, closed contacts 259, line 377, line 340, to the hot line 232, thus energizing the relay 52 upon completion of the discharge of the capacitor 51. The energization serves to index the cam unit, as previously described, to move the cam unit into position nine.

Figure 12:
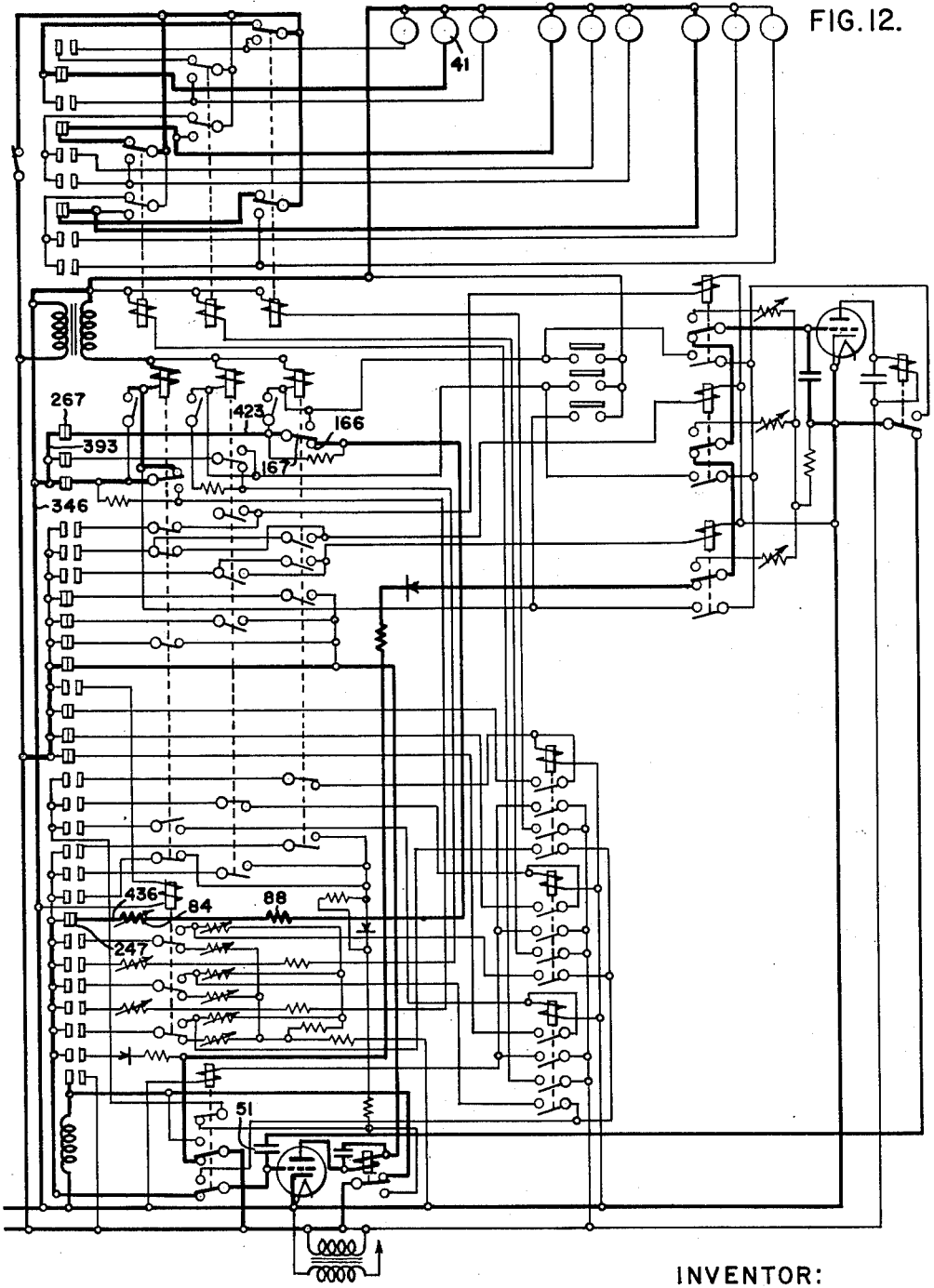

FIGURE 12 shows the controller in position 9, in which position the clearance signal 41 for traffic movement number three is being energized, and the interval of energization of this signal is timed in position 9. In this position the capacitor 51 is discharging through the closed contacts 247, line 436, variable resistor 84, fixed resistor 88, closed contacts 166, 167, line 423, closed contacts 267, line 399 and line 346 which is connected to the common return line 230. When the capacitor 51 is completely discharged the relay 52 is energized through the circuit previously described to index the cam unit to position 1.

Figure 13:
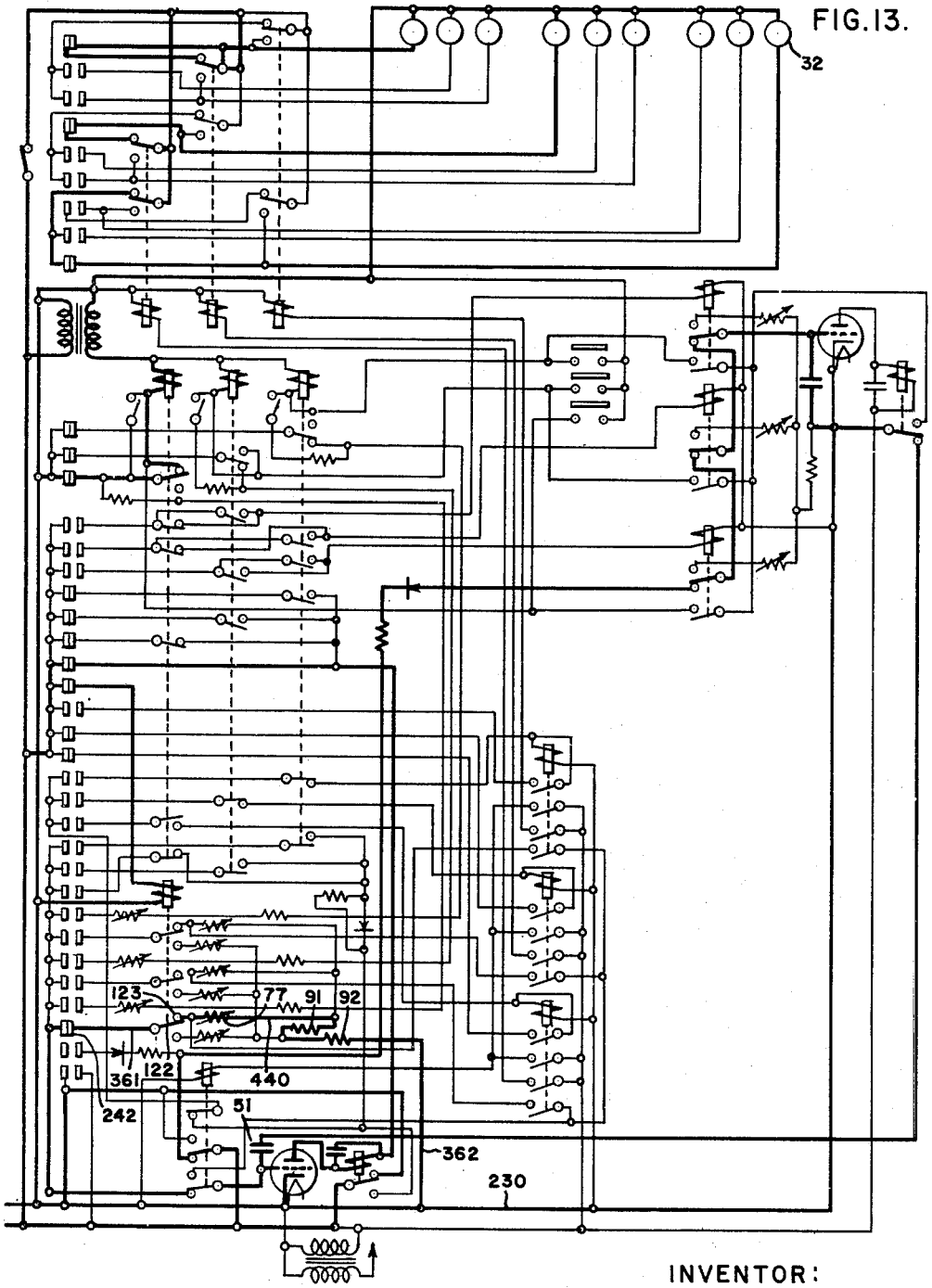

FIGURE 13 shows the condition of the controller circuits in position 1, which is the initial timing interval for the energization of the proceed signal 32, for traffic movement number one. In this position the capacitor 51 is discharging through the closed contacts 242, line 361, closed contacts 122, 123, variable resistor 77, line 440, fixed resistors 91, 92, and line 362, which is connected to the common return line 230. On completion of the discharge of the capacitor 51 the relay 52 is again energized to index the cam unit to position 2, which is the extension timing interval for the display of the proceed signal 32 to traffic movement number 1. This brings the controller back to position 2 in which the controller started, as shown in FIGURE 1, and thus completes the cycle of operation of the controller. The skip feature of the controller is accomplished through what may be broadly termed transfer means which will operate in the absence of the operation of memory means to provide the skip phase feature. The transfer and memory means are shown in the block function diagram of FIGURE 21.

*Time Extension and Phase Skipping Controller Operation*

The operation of the time extension, maximum extension, and interval skipping features of the controller will next be described.

Figure 14:
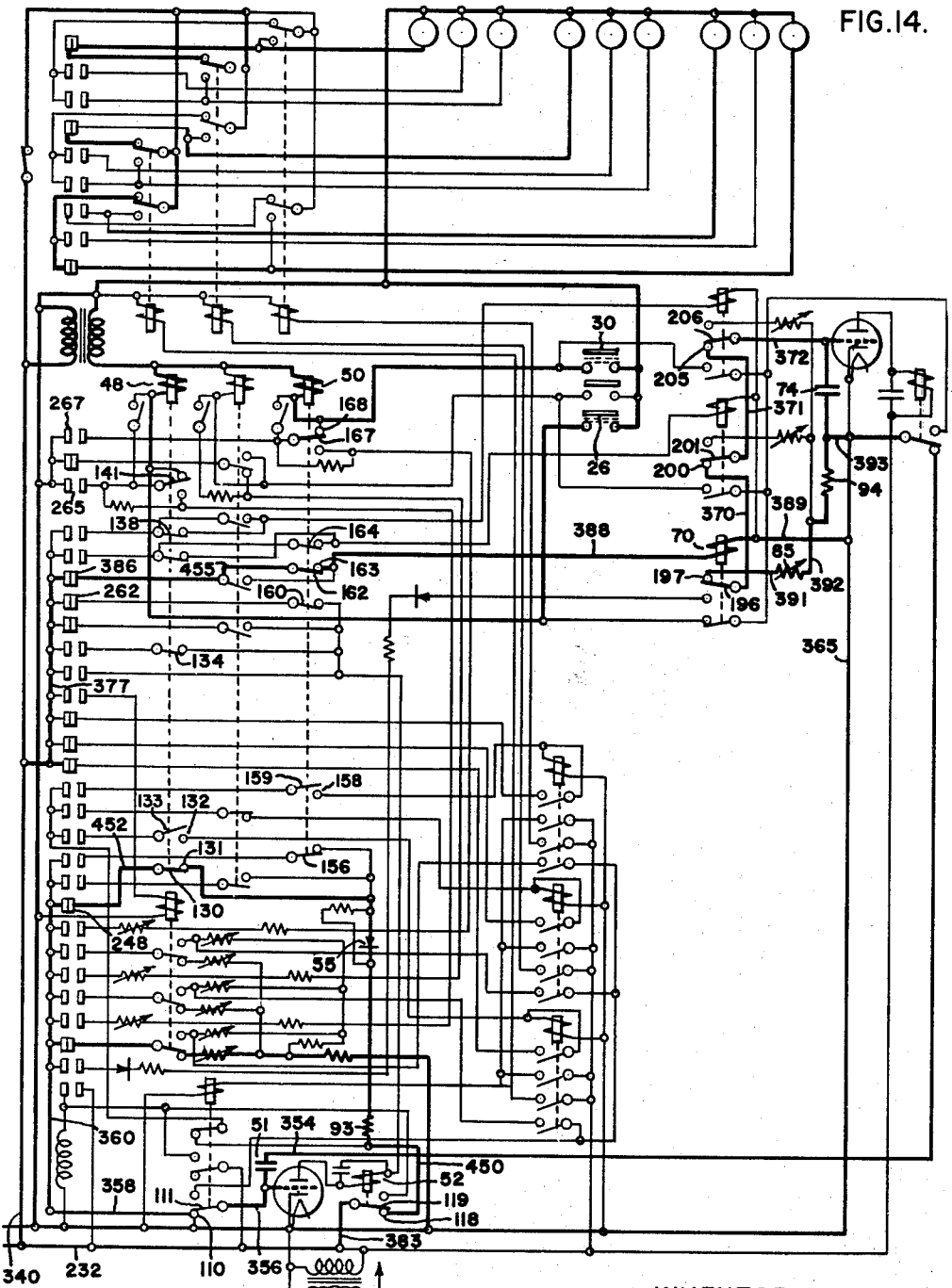

FIGURE 14 shows the condition of the controller circuit in position 2, similar to that described in connection with FIGURE 1, but in FIGURE 14 a solid line of vehicles is proceeding along street number one to continually give momentary actuations of the detector 26. With each actuation of the detector 26, the coil of the relay 48 is energized to pull up the armatures 130, 132, 134, 136, 138, 141. This is a pulsing action, however, and the relay 48 does not hold the armatures up between pulses because the holding, or memory, contacts 265, are open in this position of the controller. Each time the detector 26 is actuated, the capacitor 51 is re-charged to peak line potential through a circuit comprising hot line 232, line 383, contacts 118, 119, line 450, resistor 93, rectifier 55, contacts 130, 131, closed contacts 248, line 360, line 358, closed contacts 110, 111, line 356, line 354, which is connected to the topside of the capacitor 51. Because the capacitor 51 is continually being recharged through the circuit just described, the timing of this interval will not be completed, hence the relay 52 will not be energized. At this point let it be assumed, for purposes of explanation, that the detector 30 is actuated momentarily, to energize the relay 50, as previously described. The energization of the relay 50 serves to move the armatures 156, 158, 160, 162, 164, and 167 upward and the movement of the armature 167 into enagement with the fixed contact 168, completes a hold circuit through the closed cam contacts 267, to hold the relay 50 energized. The closing of the contacts 162, 163, completes a circuit from the hot line 232 through line 340, line 377, closed cam contacts 262, line 386, line 455, closed contacts 162, 163, line 388, coil of relay 70, line 389, to line 365 which is connected to the common return line 230, thus energizing the relay 70.

The energization of relay 70 permits the previously charged maximum timing capacitor 74 to discharge through the circuit comprising line 372, closed contacts 206, 205, line 371, closed contacts 200, 201, line 370, closed contacts 196, 197, line 391, variable resistor 85, line 392, fixed resistor 94, line 393 which is connected by line 365 to the common return line 230. Upon completion of the discharge of the capacitor 74, the relay 75 is energized by the flow of current in the plate circuit of the tube 46.

Figure 15:
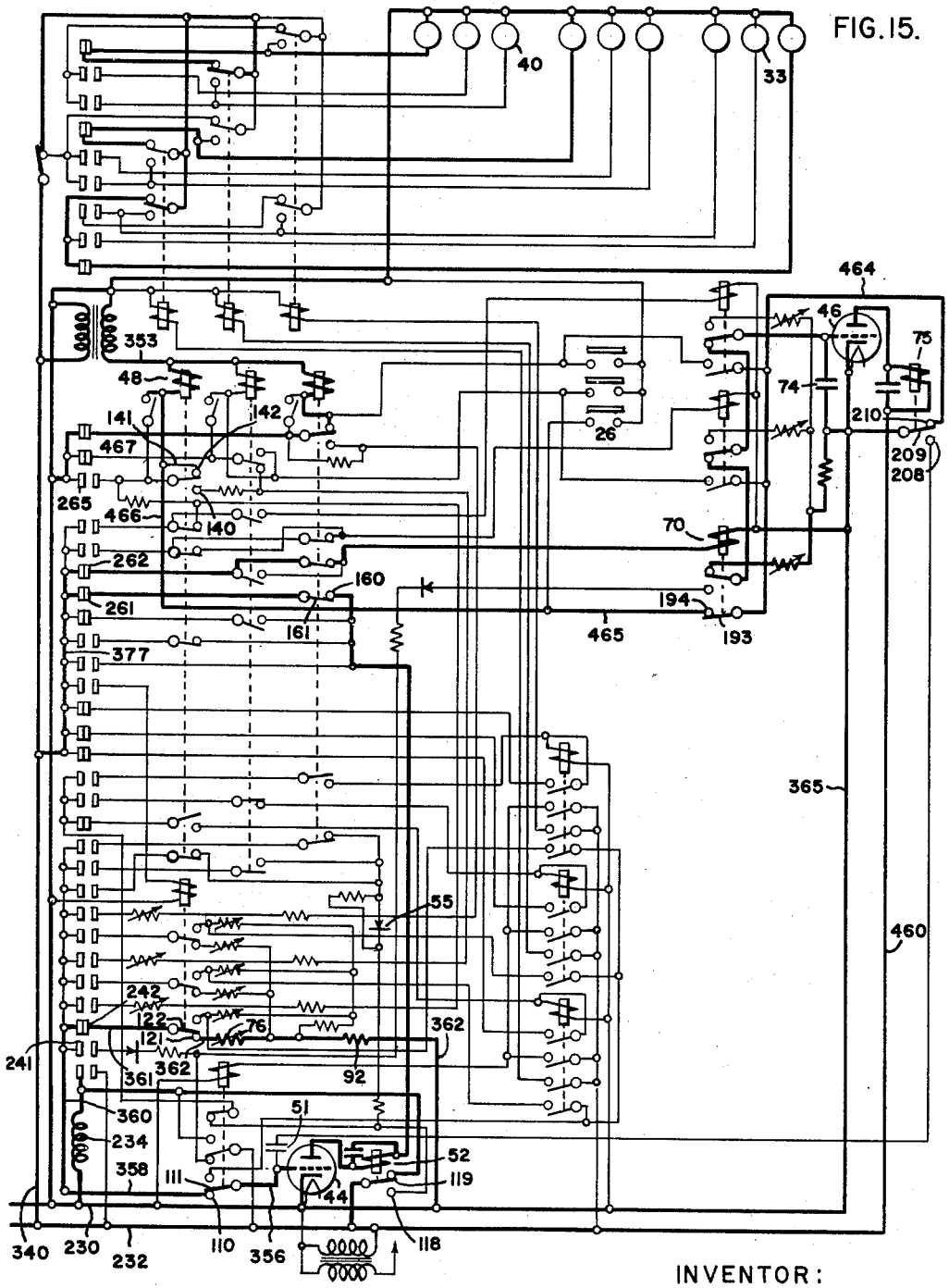

This condition of the controller is shown in FIGURE 15. In that figure, the current is flowing through the plate circuit comprising hot line 232, line 460, through the coil of relay 75, tube 46 to lines 365, 230, thus energizing the relay 75 and moving the armature 209 upward into engagement with the fixed contact 210. The movement of the armature 209 away from the fixed contact point 208 disconnects the bottom side of the capacitor 51 from the common ground line 230. The grid of the tube 44 is connected to the common ground line through the circuit comprising line 356, closed contacts 111, 110, line 358, line 360, closed cam contacts 242, line 361, closed contacts 121, 122, line 362, through the variable resistor 76, and fixed resistor 92 to the common line 230. The removal of the negative bias from the grid of tube 44 renders the tube conductive, thus energizing relay 52 through the circuit comprising line 381, coil of relay 52, line 380, closed contacts 161, 160, closed cam contacts 261, line 377, line 340 to hot line 232. The energization of relay 52 energizes the motor coil 234 of the cam unit through the circuit previously described, to index the unit to position 3, in which position the amber or clearance signal 33 is displayed to movement number one. The movement of the armature 119 away from the fixed contact point 118 upon energization of the relay 52, opens the circuit feeding the rectifier 55, so that additional actuation of detector 26 will not affect the potential on the grid of the tube 44.

When the cam unit is spinning from position 2 to position 3, the cam contacts 262 are opened thus de-energizing the relay 70 and re-charging the capacitor 74. In turn, the relay 75 is de-energized thus moving the armature 209 back into engagement with the fixed contact 208 thereby completing the return circuit to the bottom of capacitor 51 permitting it to be re-charged by the closing of the charging cam unit contacts 241, as described in connection with FIGURE 3.

While the relay 75 was energized, the closed contacts 209, 210 completed a circuit through line 464, closed contacts 193, 194 on energized relay 70 to energize the relay 48 through line 465, line 466, line 467, and the coil of relay 48 to the hot line 353. Before relay 75 de-energized, the cam unit contacts 265 closed, to hold the relay 48 energized through the closed contacts 141, 142. The effect of this is to place a call on the controller to return to the position 2 upon completion of the timing of the interval during which the proceed or green signal 40 is displayed to traffic movement number 3.

Figure 16:
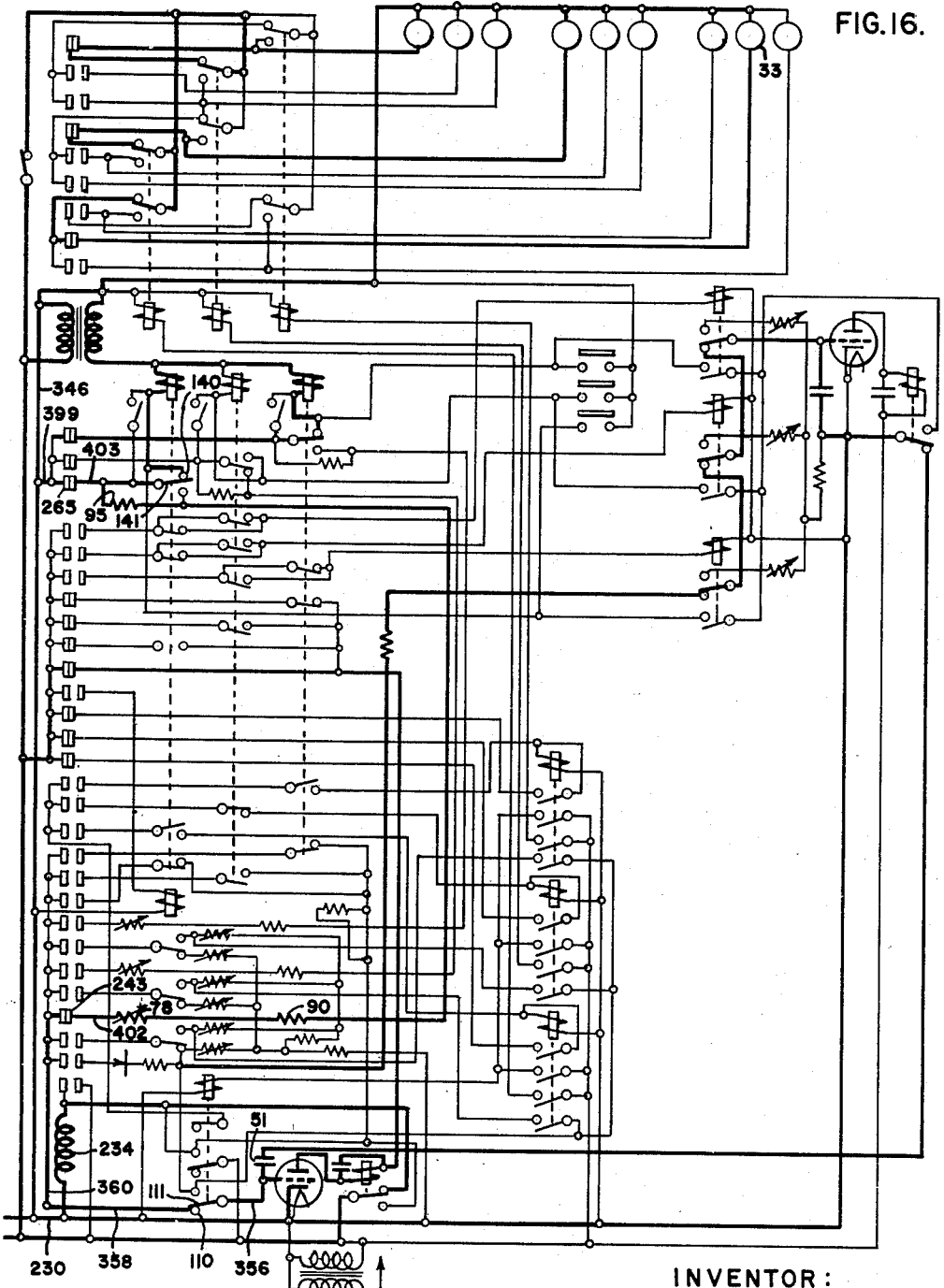

FIGURE 16 shows the condition of the controller circuit at the end of the presentation of the clearance signal 33 to traffic movement number 1, when the motor coil 234 has been energized to initiate the indexing or running of the cam unit from position 3 to position 4. During the clearance interval the contact armature 141 was moved upwardly out of engagement with the fixed contact 140, so that the discharge circuit for the capacitor 51, during the clearance interval, comprises line 354, line 356, contacts 111, 110, line 358, line 360, closed contacts 243, line 402, through resistors 78, 90, fixed resistor 95, line 403, closed contacts 265, line 399, and line 346 which is connected to the common return line 230, the fixed resistor 95 thus providing an extension of the clearance interval to allow for a vehicle to clear the intersection in a case where the maximum timer operated after a very short time extension of the clearance interval.

Figure 17:
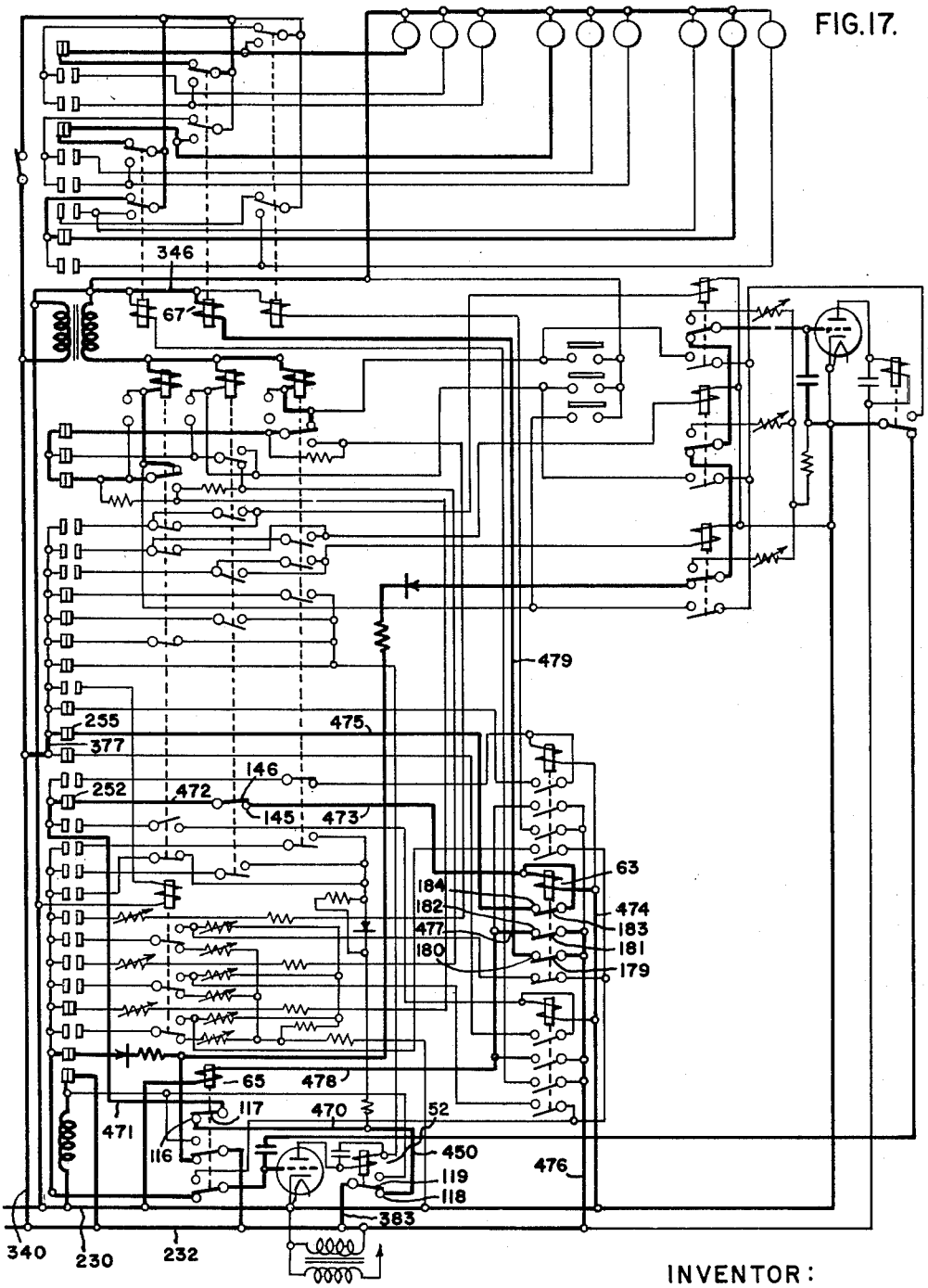

FIGURE 17 shows the condition of the controller circuit in the movement of the cam unit from position 3 to position 4, during which time operating means are called in to skip the proceed signal indication for movement number 2, and go directly to the proceed indication for movement number 3. In the position shown in FIGURE 17, a circuit is completed from the hot line 232, line 383, closed contacts 118, 119, line 450, line 470, closed contacts 116, 117, line 471, closed cam contacts 252, line 472, closed contacts 145, 146, line 473, relay coil 63, and line 474 which is connected to the common return line 230, thus energizing the relay 63. The relay 63 is held energized through the closed contacts 183, 184, and line 475 which is connected through the closed contacts 255, and line 377 to the line 340, which is connected to the hot line 232. Another hot feed is provided from the line 232, through the line 476, closed contacts 181, 182, line 477, line 478, through the skip charge relay 65 to the common return line 230, thus energizing the relay 65. The line 476 provides another hot feed through the closed contacts 179, 180, line 479 through the coil of the skip relay 67 to line 346, which is connected to the common return line 230. This circuit serves to energize the relay 67. These actions take place very rapidly as the cam unit is indexing from position 3 to position 4.

Figure 18:
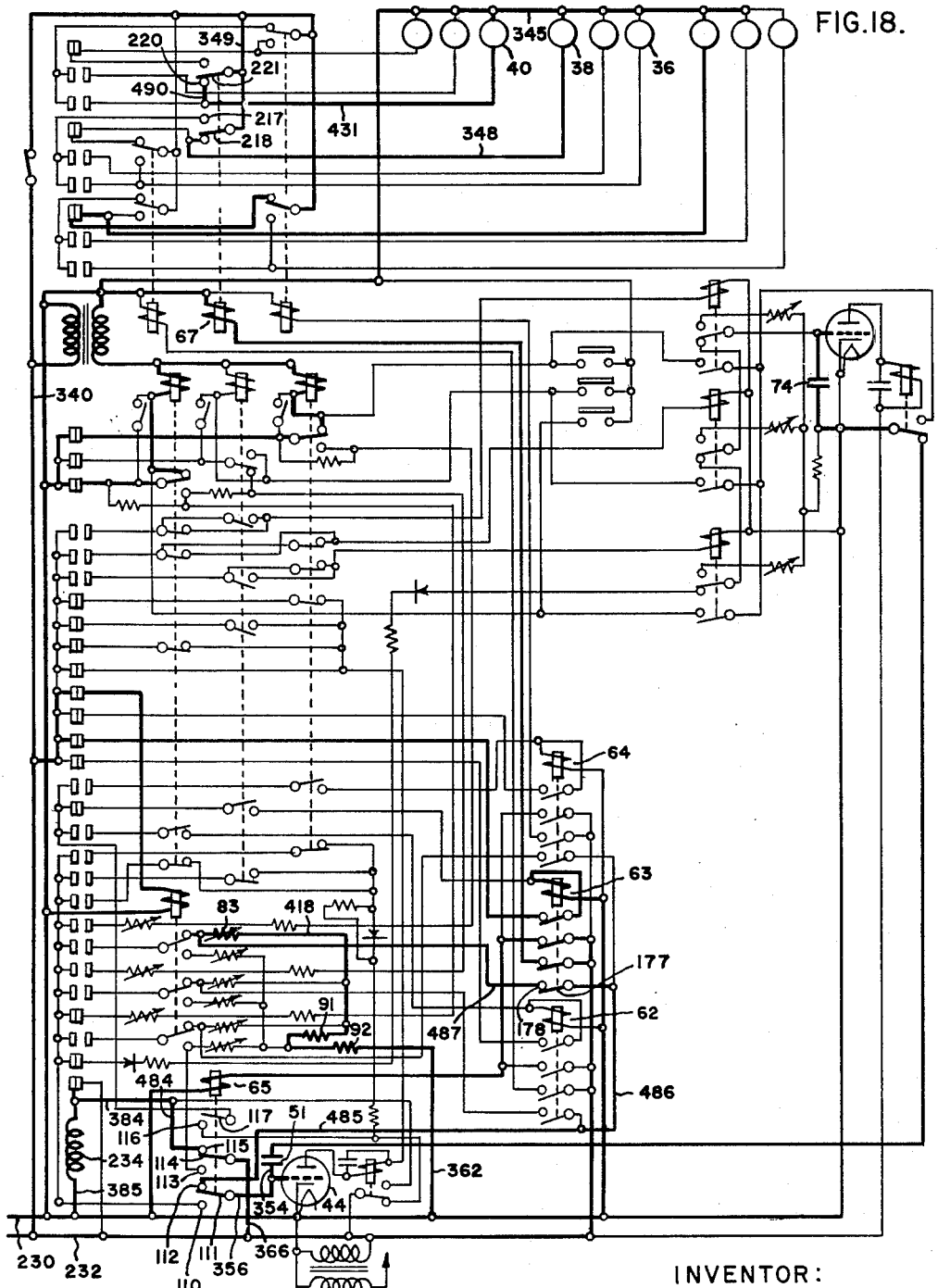

FIGURE 18 illustrates the condition of the controller circuit showing the skipping of the signal display sequence to traffic movement number two, as the result of the operations that took place in connection with the description of FIGURES 16, 17. The relay 65 has been energized, as described in connection with FIGURE 17, thus moving the armatures 111, 114, 117, upwardly to the position shown in FIGURE 18. The capacitor 51 was charged to full line potential during the index movement of the cam unit as previously described. The movement of the armature 114 upwardly away from the fixed contact 113 opens the charging circuit to both timing capacitors 51 and 74. The armature engages a fixed contact 115 to complete a circuit from the hot line 232, through line 366, and line 384, contacts 114, 115, line 484 through motor coil 234, and line 385 to the common return line 230, thus maintaining power on the cam unit motor. Armature 117 moves upwardly out of engagement with the fixed contact 116 to prevent any further actuation of the skip relays 62, 63, 64. The movement of armature 111 transfers the grid of the tube 44 and the top of capacitor 51 by a circuit comprising line 354, line 356, contacts 111, 112, line 485 to line 486, which is connected through the closed contacts 177, 178, and line 487 through the variable resistor 83, line 418, fixed resistors 91, 92, and line 362 to the common return line 230. The cam shaft is now approaching position 4, in which position the proceed signal 36 is normally energized for display to traffic movement number two. However as previously described, relay 67 has been energized thus moving the armature 218 downward into engagement with contact 217, thus providing a circuit comprising hot line 232, line 340, line 349, contacts 218, 217, to line 348, which is connected through the signal 38 to the common bus return line 345, thus energizing the signal 38. Similarly, the armature 221, of relay 67 is moved downward into engagement with the fixed contact 220, thus providing a hot feed from the line 349 through the contacts 221, 220, to line 490 which is connected by line 431 through the proceed signal 40 to the common bus return line 345, thus energizing signal 40 to present the proceed signal to the traffic movement number three. The time interval for the display of signal 40 is being timed through the adjustable resistor 83, through the circuit previously described, so that the running time of the cam unit does not change the length of the interval during which the signal 40 is displayed. The cam unit motor continues running, however, until the cam unit reaches position 7. Just prior to this point the cam contacts 255 open, de-energizing relay 63 and relay 65. The timing of the signal display in position 7 is then completed, as shown and described in connection with FIGURE 9.

When the controller is at rest displaying the proceed signal to one street and there are no actuations of the detector on that street, a call on either of the other streets will immediately initiate the transfer of the signal display sequence to that street. A call on the incoming street starts the timing of a maximum on the extension of the outgoing street. Accordingly, if the outgoing street is receiving vehicle actuations they serve to hold the proceed signal until the maximum timing expires. The controller then runs to provide the signal display sequence to the incoming street but has the memory feature, previously described, to return the controller to provide the signal display sequence to the outgoing street.

The operation of the controller is symmetrical so that the same process just described is followed for skipping any of the streets when there is no call on that street.

As previously described if a vehicle actuation is received on the street before the completion of the clearance interval, the clearance interval is extended. This is so, in order to permit a vehicle which is late in entering the intersection to clear the intersection before the stop signal is displayed to that street.

*Sequential Phase Preference Transfer Controller Operation*

As set forth in the preamble of the application, certain prior full actuated three-phase controllers have operated to transfer the right-of-way signal display sequence to the traffic movements in the order in which calls, or demands, are placed on the controller by the actuation of the detector means in the movements. The traffic engineers have determined from experience that such an operation is undesirable and that in the presence of continuous traffic the controller should function to transfer the right-of-way signal display sequence to the streets in a pre-determined sequence.

In a normal three street intersection one street is considered the most important street with a second street being of lesser importance, and a third street of the least importance. In such an intersection the right-of-way should be transferred to the streets in the presence of continuous traffic in the order of one, two and three. That is the street two and three should follow street one in the right-of-way display sequence. The controller comprising the subject of this invention functions to effect such a transfer even in the case where the right-of-way signal display is being indicated to street one, and where an actuation first received on street three and a subsequent actuation is received on street two, during the time when the clearance interval is being displayed to street one. This is known as sequential phase preference transfer and is accomplished by the memory and transfer means shown in the block function diagram 21, operating conjointly, as previously described.

If, for example, the controller is resting in position 2, as shown in FIGURE 4, and an actuation is received by detector 30 on movement number three, the detector relay 50 will be energized similarly to the energization of the relay 49, as described in connection with FIGURE 2. This energization of detector relay 50 will, in like manner, cause the controller to be indexed from position 2 to position 3, as described in connection with FIGURES 3 and 4, wherein the amber signal 33 is energized for display to traffic movement number one.

If, at this point, detector 28 in movement number two is actuated, relay 49 will be energized and the armature 146 will be moved upwardly to the position as shown in FIGURE 3. Such energization of the detector relay 49 breaks the circuit between the skip contacts 252 and the skip relay 63 for movement number two, by reason of the separation of the armature 146 of relay 49 from the fixed contact 145. Accordingly, the closing of the skip cam contacts 252 between positions 3 and 4 of the cam unit as indicated on the cam chart on FIGURE 19, and as just described in connection with FIGURES 15 to 18, will not cause the energization of the skip relay 63, since the circuit is open between the armature 146 and the fixed contact 145 of the relay 49. Accordingly, the right-of-way signal display sequence for movement number two will be presented to that movement even though the actuation of detector relay 28, for that movement, took place during the clearance interval for movement number one, and subsequent to the actuation of the detector 30 in movement number three.

Switches 58, 59, 60 are recall switches. The purpose of these switches is to permit the controller to be continuously recalled to the street for which the recall switch is closed; that is to say, when actuations on the other streets cease, the controller, by the closure of a recall switch, will be recalled to the street associated with the closed recall switch. For example, in FIGURE 1, if recall switch 58 is closed a circuit will be completed from the secondary of the transformer 47, through line 353, relay coil 48, line 494, line 403, and the cam contacts 265 which are closed in each position except the rest position 2, line 399 which is connected by line 348 to the common return line 230. From the previous description of the controller operation, it will be seen that when cam contacts 265 close the effect of the circuit just described will be to return the controller to position 2. If all three recall switches are closed the controller will cycle continuously through all three traffic movements.

It will be seen that, except for the instance in which the signal display sequence for a particular movement is skipped, the signals are operated directly from the cam unit contacts. This is a highly advantageous feature in that it minimizes the chances of faulty signal display due to relay failure. That is, in previous three movement controllers the signals have been operated through relay contacts, thus causing faulty signal display sequence when the relay operates improperly due to long periods of use, or the like. Accordingly, this feature comprises an additional improvement over prior three movement traffic controllers. The skip relays operate only during light traffic and this reduces their operations to a minimum.

What I claim is:

In a traffic controller for controlling at least three separate traffic movements through an intersection thereof, said controller comprising a cam unit having a plurality of cam contacts closing in a predetermined sequence as said cam unit is indexed through a plurality of positions, certain of said cam contacts being connected in circuit with timing means, signal cam contacts being closed for energizing traffic signal means associated with each of said movements in certain of said positions of said cam unit for presenting stop, proceed and clearance signal indications to each movement, said timing means timing the interval of dwell of said cam unit in said positions during which said signal indications are displayed to said movements, transfer means connecting said signal cam contacts to said signal means, said transfer means changing energization of said signal means from said predetermined sequence to a skip sequence, detector means positioned for actuation by traffic in a plurality of said movements, memory means for each of said movements having detector means associated therewith, said memory means having a circuit which is held open upon actuation of detector means in the associated movement, skip cam contacts connected to energize said transfer means through said memory circuit, said skip cam contacts closing upon the completion of the associated clearance signal display to energize said transfer means in the absence of a vehicle actuation of the detector means on the next movement of said predetermined sequence, whereby actuation of said detector means prior to the termination of said clearance signal display to the previous sequential movement serves to prevent energization of said transfer means and to provide a sequential phase preference transfer of the proceed and clearance signal displays from one movement to another in the presence of continuous traffic on all movements regardless of the order of actuation of said detector means.

References Cited in the file of this patent
UNITED STATES PATENTS

| | | |
|---|---|---|
| 2,100,831 | Barker | Nov. 30, 1937 |
| 2,114,968 | Nein | Apr. 19, 1938 |
| 2,124,392 | Bell | July 19, 1938 |
| 2,188,348 | Haugh | Jan. 30, 1940 |
| 2,215,851 | Horni | Sept. 24, 1940 |
| 2,751,574 | Jeffers | June 19, 1956 |
| 2,761,119 | Barker | Aug. 28, 1956 |
| 2,834,001 | Wilcox | May 6, 1958 |
| 2,879,497 | Adler | Mar. 24, 1959 |